(12) United States Patent
Sano et al.

(10) Patent No.: US 9,667,309 B2
(45) Date of Patent: May 30, 2017

(54) USER APPARATUS, BASE STATION, SUCCESSIVE INTERFERENCE CANCELING PROCESS METHOD, AND SUCCESSIVE INTERFERENCE CANCELING CONTROL METHOD

(71) Applicant: NTT DOCOMO, INC., Tokyo (JP)

(72) Inventors: Yousuke Sano, Tokyo (JP); Yusuke Ohwatari, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/910,866

(22) PCT Filed: Jun. 27, 2014

(86) PCT No.: PCT/JP2014/067136
§ 371 (c)(1),
(2) Date: Feb. 8, 2016

(87) PCT Pub. No.: WO2015/019743
PCT Pub. Date: Feb. 12, 2015

(65) Prior Publication Data
US 2016/0191115 A1 Jun. 30, 2016

(30) Foreign Application Priority Data

Aug. 8, 2013 (JP) .................................. 2013-165478
Mar. 20, 2014 (JP) .................................. 2014-059256

(51) Int. Cl.
*H04B 1/7117* (2011.01)
*H04B 1/7107* (2011.01)
(Continued)

(52) U.S. Cl.
CPC ...... *H04B 1/71072* (2013.01); *H04J 11/0043* (2013.01); *H04W 16/28* (2013.01)

(58) Field of Classification Search
USPC ........................ 375/144, 229; 455/562.1, 504
See application file for complete search history.

(56) References Cited

U.S. PATENT DOCUMENTS 9,191,044 B1 * 11/2015 Sun ...................... H04B 7/0413
2007/0105595 A1 * 5/2007 Prasad ................. H04B 7/0697
455/562.1

(Continued)

FOREIGN PATENT DOCUMENTS

| JP | 2010278722 A | 12/2010 |
| JP | 2011519525 A | 7/2011 |
| WO | 2009038178 A1 | 3/2009 |

OTHER PUBLICATIONS

International Search Report issued in corresponding application No. PCT/JP2014/067136 mailed Sep. 9, 2014 (4 pages).
(Continued)

*Primary Examiner* — Eva Puente
(74) *Attorney, Agent, or Firm* — Osha Liang LLP

(57) ABSTRACT

A user apparatus for use in a radio communication system, including: an successive interference cancelling reception unit configured to obtain a desired signal by successively canceling an interference signal that becomes interference to the desired signal from a received signal that the user apparatus receives; and an ordering determination unit configured to determine an order of interference signals to be successively canceled by the successive interference cancelling reception unit, wherein the ordering determination unit determines the order based on reception quality for each interference signal.

15 Claims, 17 Drawing Sheets

(51) Int. Cl.
*H04W 16/28* (2009.01)
*H04J 11/00* (2006.01)

(56) References Cited

U.S. PATENT DOCUMENTS

| | | | |
|---|---|---|---|
| 2009/0257477 A1 | 10/2009 | Khayrallah et al. | |
| 2010/0075703 A1* | 3/2010 | Imai | H04B 7/0417 455/501 |
| 2010/0195597 A1 | 8/2010 | Nogami et al. | |
| 2012/0314752 A1* | 12/2012 | Zeira | H04B 1/7105 375/229 |
| 2015/0319712 A1* | 11/2015 | Balachandran | H04W 52/146 370/329 |

OTHER PUBLICATIONS

Written Opinion of the International Searching Authority issued in corresponding application No. PCT/JP2014/067136 dated Sep. 9, 2014 (4 pages).
3GPP TS 36.211 V12.1.0, "3rd Generation Partnership Project; Technical Specification Group Radio Access Network; Evolved Universal Terrestrial Radio Access (E-UTRA); Physical channels and modulation (Release 12)"; Section 6; Mar. 2014 (120 pages).
3GPP TS 36.212 V12.0.0, "3rd Generation Partnership Project; Technical Specification Group Radio Access Network; Evolved Universal Terrestrial Radio Access (E-UTRA); Multiplexing and channel coding (Release 12)"; Section 5.3; Dec. 2013 (88 pages).
3GPP TS 36.213 V12.1.0, "3rd Generation Partnership Project; Technical Specification Group Radio Access Network; Evolved Universal Terrestrial Radio Access (E-UTRA); Physical layer procedures (Release 12)"; Sections 5,7,9; Mar. 2014 (186 pages).
3GPP TR 36.866 V12.0.1, "3rd Generation Partnership Project; Technical Specification Group Radio Access Network; Study on Network-Assisted Interference Cancellation and Suppression (NAIC) for LTE (Release 12)"; Mar. 2014 (64 pages).
MediaTek Inc., "New work item proposal for network assistance interference cancellation and suppresion for LTE"; 3GPP TSG RAN Meeting #63, RP-140519; Fukuoka, Japan, Mar. 3-6, 2014 (7 pages).
Axnäs J. et al., "Successive Interference Cancellation Techniques for LTE Downlink"; IEEE 22nd International Symposium on Personal, Indoor and Mobile Radio Communications, pp. 1793-1797; 2011 (5 pages).

* cited by examiner

USER APPARATUS, BASE STATION, SUCCESSIVE INTERFERENCE CANCELING PROCESS METHOD, AND SUCCESSIVE INTERFERENCE CANCELING CONTROL METHOD

TECHNICAL FIELD

The present invention relates to a technique for canceling (removing) an interference signal from a received signal to obtain a desired signal in a user apparatus used in a radio communication system.

BACKGROUND ART

In LTE (Long Term Evolution) Advanced in 3GPP (Third Generation Partnership Project), OFDMA (Orthogonal Frequency Division Multiplexing Access) using MU-MIMO (multi-user multiple-input multiple-output) is proposed. In downlink transmission of MU-MIMO, one base station can communicate with a plurality of user apparatuses, and in addition to that, the base station can also transmit different data streams (layers) to one user apparatus at the same time.

Also, in the LTE-Advanced, in the downlink communication, various techniques are considered for reducing (suppressing, removing, for example), at the user apparatus, interference of an interference radio beam from an interference base station against a desired radio beam from a connecting base station, and interference of signals to other users at the connecting base station.

In the technique for reducing such interferences, for example, as shown in FIG. 1, in a case where a user apparatus 10 resides near a border of a connecting cell (cell of a connecting base station 1, serving cell), so the user apparatus 10 strongly receives an interference radio beam from another base station 2 (interference base station) adjacent to the desired base station 1, the user apparatus 10 can improve reception quality of the desired signal carried on a desired radio beam by performing interference reduction processing. In FIG. 1, a beam generated by the interference base station 2, that is, a part of beams for a downlink channel to other user apparatus (user apparatus 5, for example) becomes an interference signal for the user apparatus 10. FIG. 1 especially shows interference from an interference cell.

RELATED ART DOCUMENT

Non-Patent Document

Non-Patent Document 1: Axnas J. et. al., "Successive Interference Cancellation Techniques for LTE Downlink," PIMRC 2011.

SUMMARY OF THE INVENTION

Problem to Be Solved By the Invention

As a technique for the above-mentioned interference reduction, there is successive interference cancellation (SIC: Successive Interference Cancellation).

The successive interference cancellation is a technique for generating a replica signal by performing hard decision or soft decision for the interference signal from the received signal, and successively subtracting (removing) the replica signal from the received signal so as to extract a desired signal. A functional configuration example of a SIC receiver (a SIC reception process unit in a user apparatus) is shown in FIG. 2 when the user apparatus performs the successive interference cancellation. FIG. 2 is an configuration example of soft decision SIC in which symbol demodulation is performed by IRC (Interference Rejection Combining) reception processing. For each of a plurality of interference signals, the SIC receiver performs channel estimation of the interference signal, demodulates (IRC demodulation) the interference signal based on the channel estimation, generates a replica of the interference signal, and successively subtracts the interference signal from the received signal to obtain a desired signal.

The configuration of the successive interference cancellation in itself is a conventional technique. Various schemes exist other than the scheme shown in FIG. 2. The present invention can be applied to any successive interference canceller, irrespective of the scheme, as long as it includes a function for generating a replica, and successively subtracting the interference replica from the received signal. By the way, as a prior art document on SIC, there is the non-patent document 1, for example.

In the SIC receiver, the order for performing subtraction of interference replicas (to be referred to as ordering hereinafter) exerts large effect on characteristics. That is, by performing ordering in an order from the highest accuracy of demodulation or decoding by the SIC receiver (in a descending order from the highest), it is possible to generate an interference replica in the latter stage more accurately. Considering a SIC for canceling an interference signal from other user/cell, interference signals of various ranks and MCS coexist. Thus, proper ordering in consideration of these is necessary. On the other hand, if all of interference signals are ordered to cancel them by SIC, process load of the SIC receiver becomes high.

The present invention is contrived in view of the above-mentioned points, and an object of the present invention is to provide a technique to enable a user apparatus for performing interference canceling by SIC to properly perform ordering of interference signals and to execute canceling of the interference signals.

Means for Solving the Problem

According to an embodiment of the present invention, there is provided a user apparatus for use in a radio communication system, including:

an successive interference cancelling reception unit configured to obtain a desired signal by successively canceling an interference signal that becomes interference to the desired signal from a received signal that the user apparatus receives; and an ordering determination unit configured to determine an order of interference signals to be successively canceled by the successive interference cancelling reception unit, wherein the ordering determination unit determines the order based on reception quality for each interference signal.

According to an embodiment of the present invention, there is provided a base station, for use in a radio communication system, configured to communicate with a user apparatus, wherein the user apparatus includes an successive interference cancelling reception unit configured to obtain a desired signal by successively canceling an interference signal that becomes interference to the desired signal from a received signal that the user apparatus receives, the base station including:

an interference control information reception unit configured to receive control information of an interference signal from an interference base station for the user apparatus;

an ordering determination unit configured to determine an order of interference signals to be successively canceled by the successive interference cancelling reception unit of the user apparatus based on the control information of the interference signal; and a transmission unit configured to transmit, to the user apparatus, information of the order of interference signals determined by the ordering determination unit.

Also, according to an embodiment of the present invention, there is provided a successive interference canceling process method executed by a user apparatus for use in a radio communication system, including:

an ordering determination step of determining an order of interference signals to be successively canceled in a successive interference cancelling process for obtaining a desired signal by successively canceling an interference signal that becomes interference to the desired signal from a received signal that the user apparatus receives; and a successive interference cancelling process step of performing the successive interference cancelling process according to the order of interference signals determined in the ordering determination step, wherein, in the ordering determination step, the user apparatus determines the order based on reception quality for each interference signal.

Also, according to an embodiment of the present invention, there is provided a successive interference canceling control method executed by a base station, for use in a radio communication system, configured to communicate with a user apparatus, wherein the user apparatus includes a successive interference cancelling reception unit configured to obtain a desired signal by successively canceling an interference signal that becomes interference to the desired signal from a received signal that the user apparatus receives, the successive interference canceling control method including:

an interference control information reception step of receiving control information of an interference signal from an interference base station for the user apparatus;

an ordering determination step of determining an order of interference signals to be successively canceled by the successive interference cancelling reception unit of the user apparatus based on the control information of the interference signal; and a transmission step of transmitting, to the user apparatus, information of the order of interference signals determined by the ordering determination step.

Effect of the Present Invention

According to an embodiment of the present invention, it becomes possible that a user apparatus for performing interference canceling by SIC properly orders interference signals and executes canceling of the interference signals.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

Outline of the Embodiment

Figure 3:
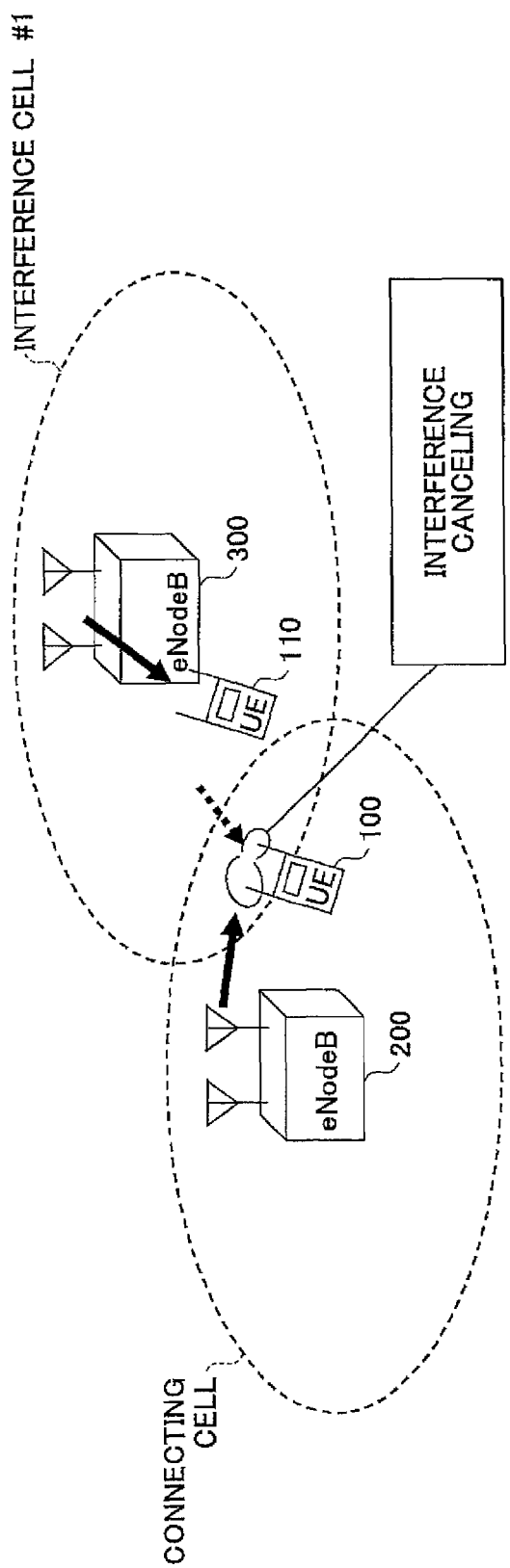
FIG. 3 is a schematic block diagram of a radio communication system in the present embodiment.

FIG. 3 shows a schematic block diagram of a radio communication system of the present embodiment. The radio communication system of the present embodiment is a radio communication system of the LTE-Advanced scheme, for example, in which a base station 200 (eNodeB) (connecting base station) forms a connecting cell, and a user apparatus 100 (UE) in the cell performs communication with the connecting base station 200 by a desired signal. The radio communication system of the present embodiment includes at least functions defined in the LTE-Advanced. But, the present invention is not limited to the scheme of the LTE-Advanced, and the present invention can be applied also to radio communication systems of the future generation of LTE-Advanced, and to schemes other than LTE.

Normally, the radio communication system is provided with many base stations. However, FIG. 3 only shows the connecting base station 200 and the base station 300 adjacent to the connecting base station 200. This adjacent base station 300 also forms a cell to perform signal transmission and reception with a user apparatus 110 for which the base station 300 is a connecting base station. A signal transmitted from the adjacent base station 300 to the user apparatus 110 for which the base station 300 is a connecting base station becomes an interference signal for the user apparatus 100. Therefore, in the present embodiment, the adjacent base station 300 is called an interference base station. Also, a cell of the interference base station 300 is called an interference cell. Although, in general, there are a plurality of interference base stations for a connecting base station, FIG. 3 shows only one interference base station.

In the present embodiment, ordering is performed in consideration of reception quality, rank, MCS and the like of an interference signal. The reception quality of the interference signal is, for example, reception power, SINR (Signal-to-Interference and Noise Ratio, to be referred to as output SINR hereinafter) after signal combining/separation by a modulator (IRC modulation and the like), BER (bit error rate), BLER (block error rate) and the like.

Further, for reducing process load in the user apparatus 100, interference signals for which cancellation processing is performed by SIC are restricted. In the following, various methods of ordering are described in a first embodiment, and various methods for restricting interference signals for which cancellation processing is performed by SIC are described in a second embodiment.

First Embodiment

In the following, various methods for ordering are described. In the following examples, in a case where the user apparatus 100 uses rank, modulation scheme, MCS and the like of an interference signal, these pieces of information are transmitted from the connecting base station 200 to the user apparatus 100, for example, or these pieces of information are estimated by the user apparatus 100.

Example 1-1: Reception Quality Based in the User Apparatus 100

In the example 1-1, the user apparatus 100 measures reception quality of interference signals for each interference signal, and performs ordering in a descending order of goodness of the reception quality. In this example, as an example of reception quality, RSRP (Reference Signal Received Power) is used.

RSRP is an average received power of a reference signal (RS) within measurement band per 1 resource element (RE). In the example 1-1, since ordering is performed based on received power measurement for which process load is low, ordering can be realized with low process load.

Example 1-2: Output SINR Based in User Apparatus 100

In the example 1-2, the user apparatus 100 performs demodulation processing for each interference signal (example: IRC demodulation processing), obtains output SINR for each stream obtained by the demodulation processing, and performs ordering in a descending order of the output SINR. For example, in a case where output SINRs are obtained in a descending order of stream 1 of an interference signal 1 (called signal A), stream 1 of an interference signal 2 (called signal B), and stream 2 of the interference signal 2 (called signal C), ordering is performed in an order of signal A, signal B and signal C, and replica subtraction is performed in this order.

In the example 1-2, the user apparatus 100 is notified of ranks for each interference signal (information of the number of streams) from the connecting base station 200, so that the user apparatus 100 identifies the number of streams for each interference signal by the rank information, and obtains output SINR for each stream. By the way, the rank may be estimated by the user apparatus 100.

In the example 1-2, since the rank (stream) is considered, it can be expected to get higher accuracy than the example 1-1 in ordering.

Example 1-3: Grouping

In the example 1-3, the user apparatus 100 groups interference signals by using rank and/or MCS (Modulation and Coding Scheme, modulation scheme and coding scheme), then, for the grouped interference signals, the user apparatus 100 performs RSRP based grouping of example 1-1, or performs output SINR based grouping of example 1-2. The following example especially focuses on modulation scheme in the information of modulation scheme and coding scheme associated with MCS.

For example, the user apparatus 100 groups interference signals based on rank, then, after that, the user apparatus 100 performs RSRP based ordering for each group. In this example, the groups are ordered in an ascending order of rank number (the number of streams), that is, in an order of group of rank 1, group of rank 2, group of rank 3, for example, and performs RSRP based ordering for each group. For example, in a case where grouping is performed for rank 1 and rank 2, and when a descending order of RSRP is obtained as interference signal 1, interference signal 2, and interference signal 3 as a result of RSRP measurement in the group of rank 1, and, a descending order of RSRP is obtained as interference signal 4, interference signal 5, and interference signal 6 as a result of RSRP measurement in the group of rank 2, then, the user apparatus 100 performs replica subtraction in order of interference signal 1, 2, 3, 4, 5 and 6.

Also, for example, after grouping based on modulation scheme and rank, the user apparatus 100 performs RSRP based ordering for each group. In this case, for example, the user apparatus 100 groups interference signals based on predetermined combinations of modulation scheme and rank. For example, interference signals are grouped into a group in which modulation scheme is QPSK and rank is 1, next, a group in which modulation scheme is 16QAM and rank is 1, and the like. Then, the user apparatus 100 performs RSRP based ordering for each group, and performs whole ordering similarly to the above-mentioned case.

Also, for example, after grouping based on modulation scheme, the user apparatus 100 can perform output SINR based ordering for each group. In this case, for example, the user apparatus 100 performs grouping in an ascending order of multilevel number, like QPSK group, first, then, 16QAM group. Then, the user apparatus 100 obtains output SINR for each interference signal (for each stream) in each group to perform ordering.

In the example 1-3, since MCS or rank of the interference signal can be considered, it can be expected to perform ordering more accurately than the example 1-1, and the example 1-2.

Example 1-4: Utilizing Auxiliary Information Reported From Base Station

In the example 1-4, the connecting base station 200 dynamically or semistatically notifies the user apparatus 100 of probability information (information indicating a ratio) of modulation scheme (or rank) of an interference signal as auxiliary information, and the user apparatus 100 performs RSRP based (or output SINR based, or BER based) ordering considering the probability information. For the dynamic notification, PDCCH is used, for example. For the semistatic notification, RRC signaling is used, for example.

Figure 4:
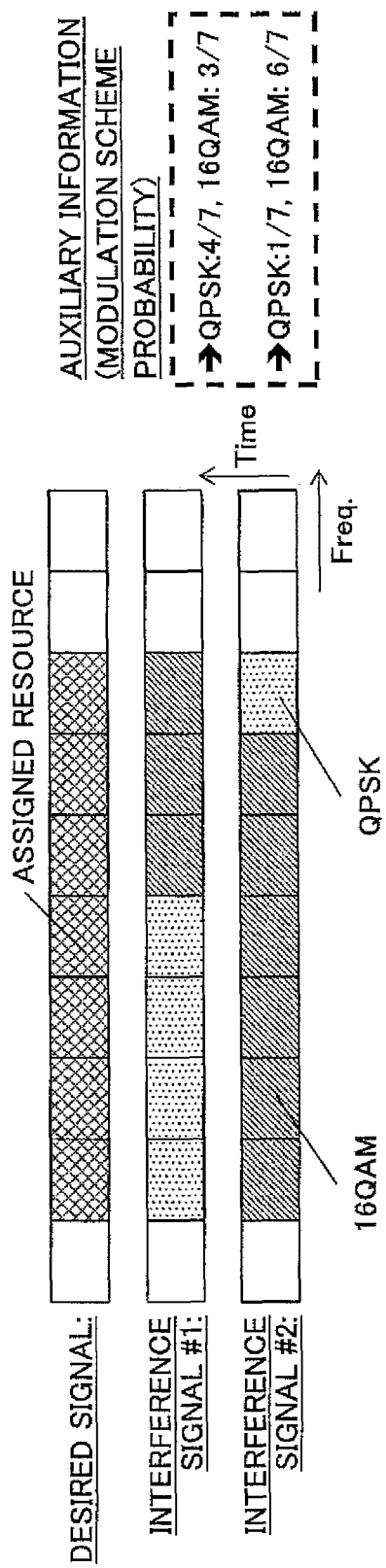
FIG. 4 is a diagram for explaining an example of auxiliary information reported from a connecting base station 200.

An example of the auxiliary information transmitted from the connecting base station 200 is described with reference to FIG. 4. FIG. 4 shows interference signals #1 and #2 that become interference for assigned resources (resources assigned to the user apparatus 100) of a desired signal transmitted by the connecting base station 200. Then, as shown in FIG. 4, as for the interference signal #1, in the 7 assigned resources, modulation scheme for 4 resources is QPSK, and modulation scheme for 3 resources is 16QAM. Therefore, as auxiliary information (probability information) for the interference signal #1, QPSK:4/7 and 16QAM:3/7 are obtained. Also, as for the interference signal #2, in the 7 assigned resources, modulation scheme for 1 resource is QPSK, and modulation scheme for 6 resources is 16QAM. Therefore, as auxiliary information (probability information) for the interference signal #2, USK:1/7 and 16QAM:6/7 are obtained. There pieces of auxiliary information are transmitted to the user apparatus 100.

The user apparatus 100 provides the measured RSRP with an offset based on the auxiliary information received from the connecting base station 200, and performs ordering based on the corrected RSRP. For example, the user apparatus 100 calculates a corrected RSRP using the following correction formula. In the following formula, A and B are constants, and A>B holds true.

$$\alpha = (\text{probability of QPSK}) \times A + (\text{probability of 16QAM}) \times B$$

$$(\text{corrected RSRP}) = (\text{measured RSRP}) + \alpha$$

The above formula is to largely weight the modulation scheme of a small multilevel number. By this correction, in the example of FIG. 4, for example, there is a possibility that, although measured RSRP is high in the interference signal #2, corrected RSRP is high in the interference signal #1 in which the multilevel number is low.

In the above-mentioned example, the user apparatus 100 receives auxiliary information from the connecting base station 200 to calculate an offset value $\alpha$ based on the auxiliary information. However, the connecting base station 200 may calculate the offset value $\alpha$ based on probability information such as one shown in FIG. 4, and may notify the user apparatus 100 of the offset value $\alpha$.

As an example, in the example of situation shown in FIG. 4, the connecting base station 200 calculates $\alpha$=(probability of QPSK)×A+(probability of 16QAM)×B in the same way as the above-mentioned method. For example, when an offset value of the interference signal #1 is calculated as 5 dBm, and an offset value of the interference signal #2 is calculated as 1 dBm, these pieces of information are transmitted to the user apparatus 100, so that the user apparatus 100 calculates corrected RSRP by (corrected RSRP)=(measured RSRP)+$\alpha$, and performs ordering based on the corrected RSRP.

Example 1-5: Based on BER (Bit Error Rate) Calculated Based on Output SINR in the User Apparatus 100

In the example 1-5, first, in the same way as the example 1-2, the user apparatus 100 obtains output SINR for each stream after demodulation processing (example: after IRC demodulation processing) of the interference signal. The user apparatus 100 holds, in a storage device, as known information, SNR-BER correspondence information for each MCS in an AWGN environment. So, the user apparatus 100 maps the output SINR into a SNR-BER curve so as to obtain BER corresponding to the output SINR, and performs ordering based on the BER.

Figure 5:
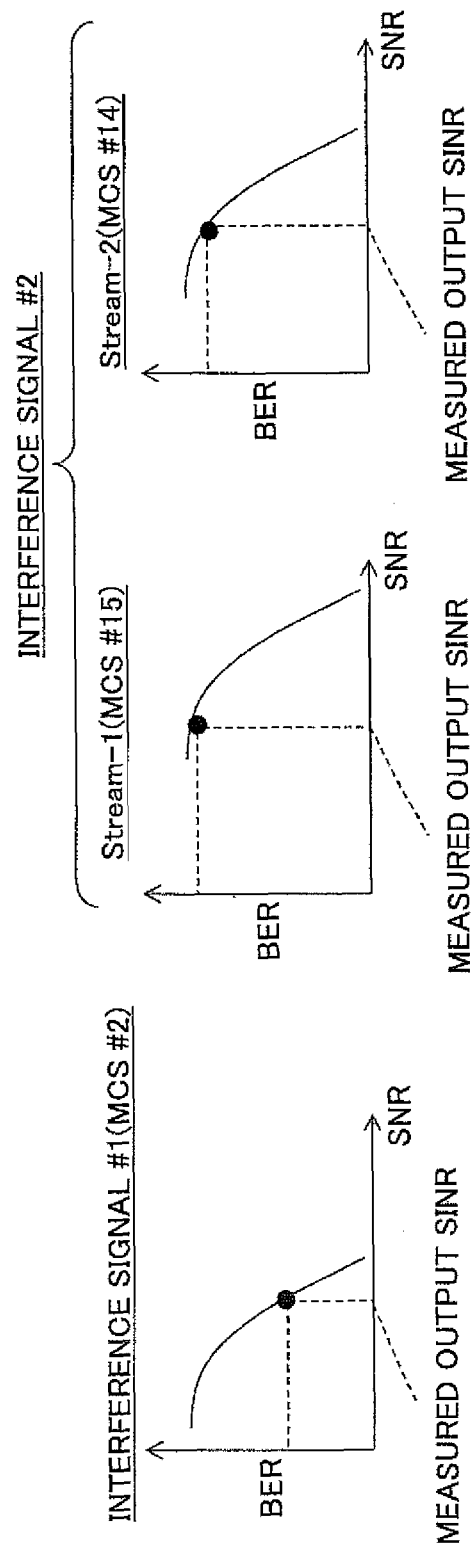
FIG. 5 is a diagram showing an example for obtaining BER based on an output SINR.

For example, as shown in FIG. 5, in a case where BER1 is obtained for an interference signal #1 (1 stream, called signal A), BER2 is obtained for stream 1 of an interference signal #2 (called signal B), and BER3 is obtained for stream 2 of the interference signal #2 (called signal C), BER1<BER3<BER2 holds true. The smaller the BER is, the higher the quality of the signal is. Thus, in this case, signals are ordered in an order of signal A, signal C and signal B.

In this example, a SNR-BLER (Block error rate) curve may be used instead of the SNR-BER curve. Also, when using the SNR-BLER curve, in the same way as the case where the SNR-BER curve is used, the output SINR is mapped onto SNR-BLER curve to obtain BLER corresponding to the output SINR, and to perform ordering based on the BLER.

Example 1-6: Repeat Ordering for Each Step of SIC

Figure 1:
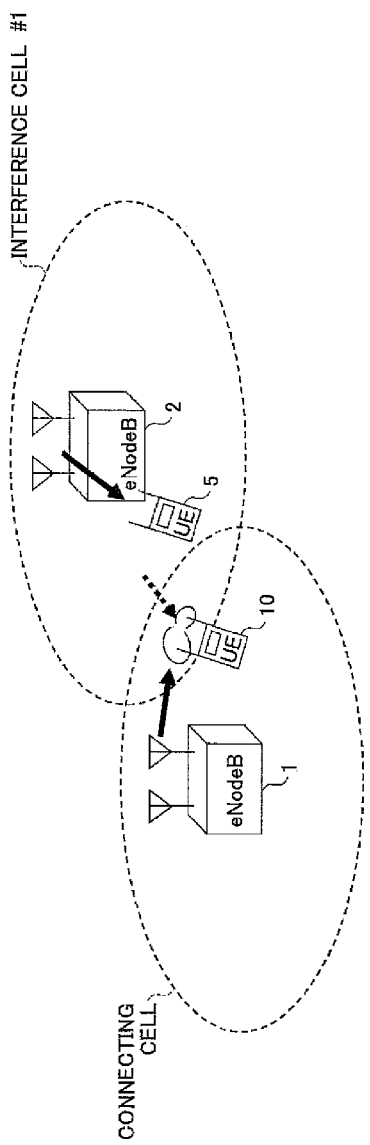
FIG. 1 is a diagram for explaining reduction of interference from an interference cell.
Figure 2:
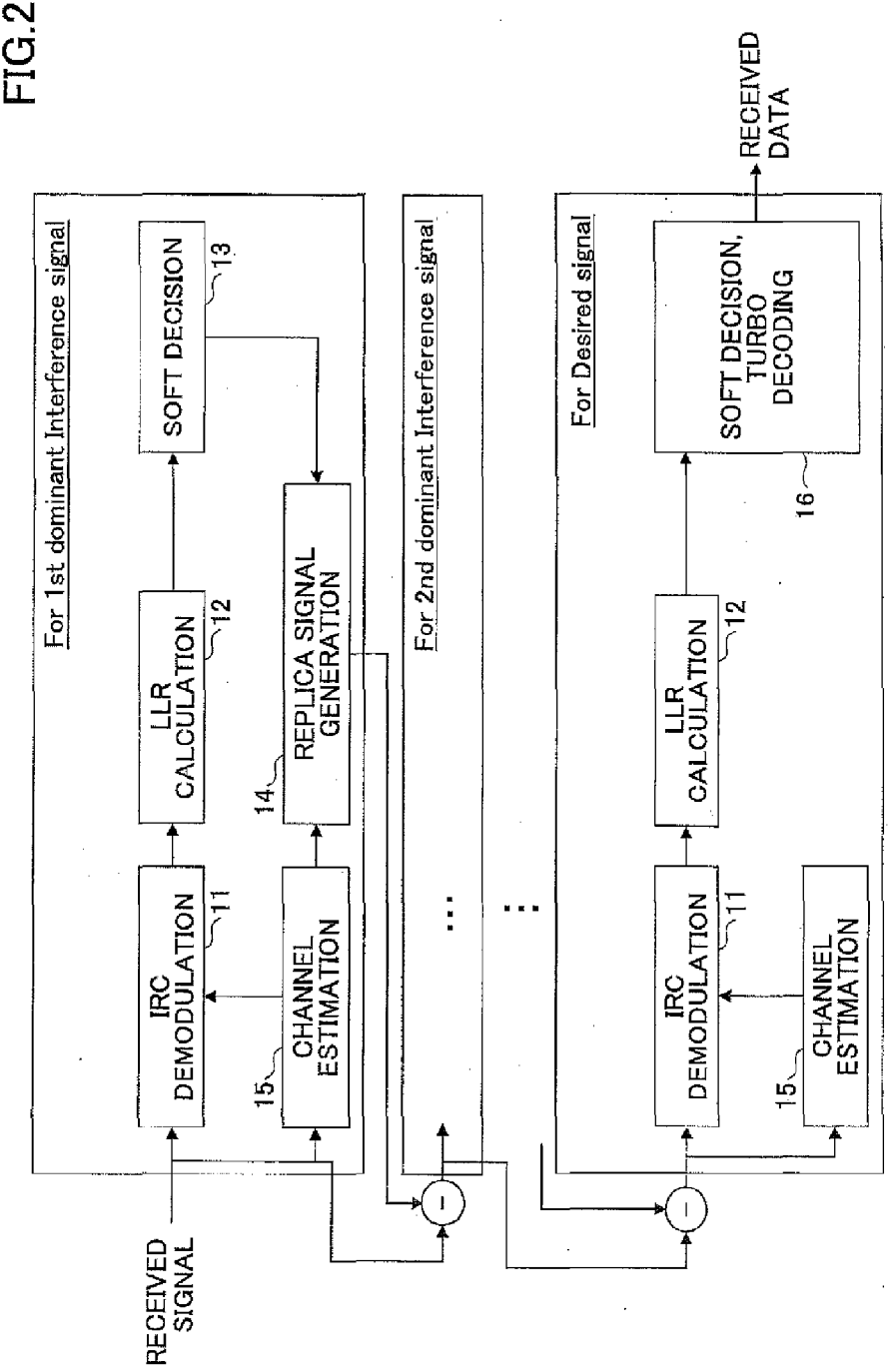
FIG. 2 is a diagram showing a functional configuration example of a user apparatus (SIC reception process unit) that performs SIC.
Figure 6:
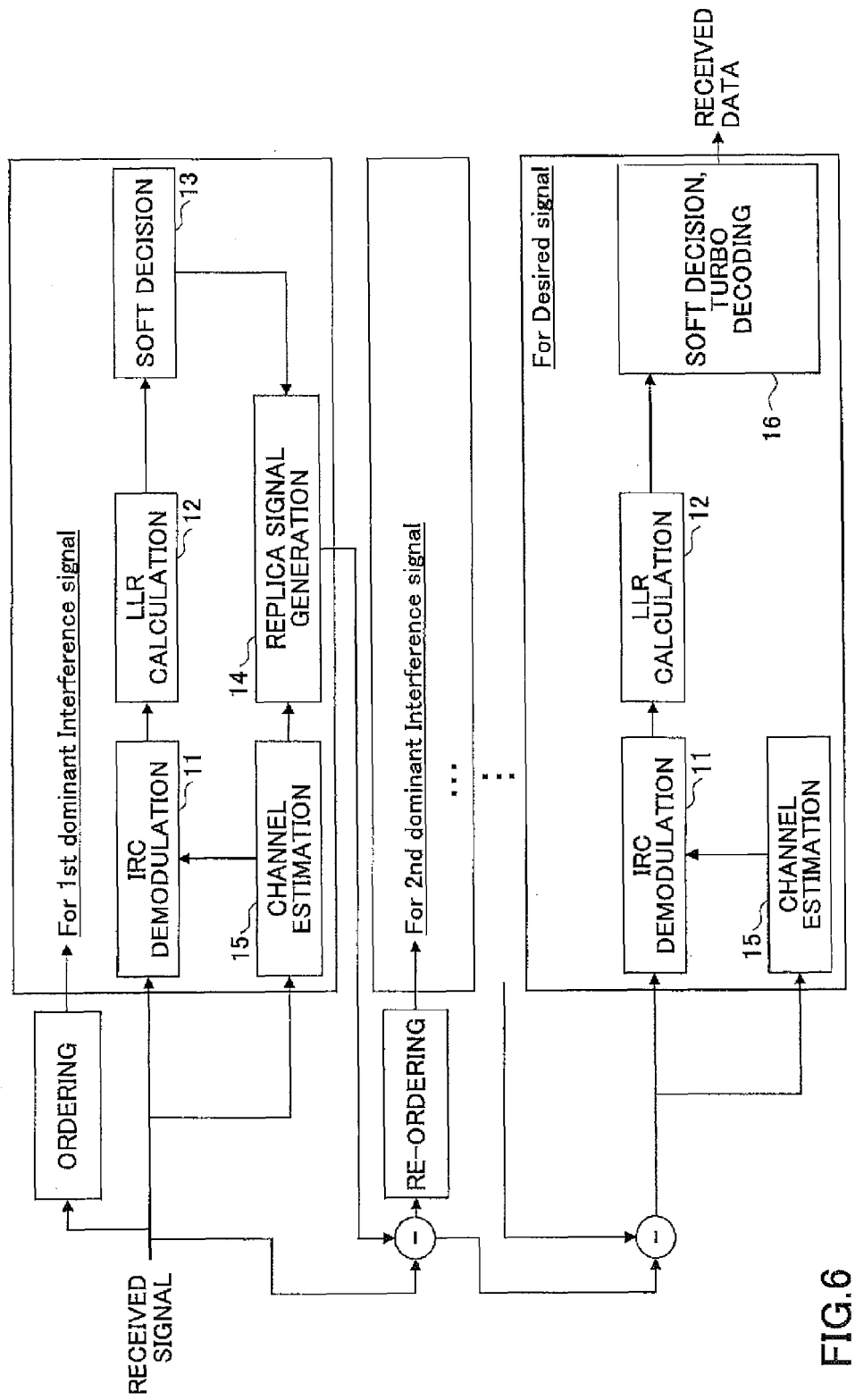
FIG. 6 is a diagram showing a configuration example of a SIC reception process unit in a case where ordering is repeated for each step.

The example 1-6 repeats a process of performing ordering for received signals, first, subtracting a replica of the top level signal from the received signals, performing ordering again for the received signals after the subtraction is performed, and subtracting the top level signal. FIG. 6 shows a functional configuration example of a SIC reception process unit corresponding to FIG. 2 in a case where such a process is performed. As shown in FIG. 6, in each step, ordering is performed again for signals obtained by subtracting the top level interference signal from the received signal.

In the signal after the top level interference signal is removed, since effect of the top level interference signal is removed, there is a possibility that the result of reordering becomes different from the result of ordering before removal of the top level interference signal. Thus, it can be expected that more proper ordering is performed. That is, it becomes possible to perform successive ordering in consideration of replica subtraction effect of SIC.

Example 1-7: Select One By Which the Best Characteristics are Obtained

In the example 1-7, the user apparatus 100 executes ordering by each method of the example 1-1-example 1-6, and adopts ordering by which a desired signal of the best characteristics is obtained from among the methods of the examples 1-1-1-6. In the example 1-7, although optimum ordering can be surely performed, the load of the user apparatus 100 becomes high.

Example 1-8: Dynamic or Semistatic Notification of Ordering From Connecting Base Station 200

Basically, the examples from 1-1 to 1-7 are examples in which the user apparatus 100 determines ordering. On the other hand, in the example 1-8, the connecting base station 200 determines ordering, and notifies the user apparatus 100 of information of the determined ordering.

For example, the connecting base station 200 determines ordering in consideration of resource assignment situation, MCS and rand and the like of the desired signal and the interference signal, and notifies the user apparatus 100 of the ordering using PDCCH (for dynamic notification), RRC signaling (for semistatic notification) and the like. As for the resource assignment situation, MCS, and the rank and the like of the interference signal, the connecting base station 200 obtains these pieces of information from the interference base station.

As an example, for the interference signals shown in FIG. 4, the connecting base station 200 obtains α and β by using the following formulas and calculates α+β for each interference signal, and orders interference signals in an descending order of α+β. That is, the higher the α+β is, the higher the order is.

$$\alpha = (\text{probability of QPSK}) \times A + (\text{probability of 16QAM}) \times B$$

$$\beta = (\text{probability of rank 1}) \times C + (\text{probability of rank 2}) \times D$$

In the above-mentioned formulas, A, B, C, and D are constants, and A>B and C>D hold true. Also, the probability of rank 1 is a ratio of resources transmitted by rank 1 in assigned resources of the interference signal that become interference to the desired signal. The same applies to the probability of rank 2.

As described above, ordering may be determined only by judgement of the connecting base station 200. Also, the user apparatus 100 may feed CQI (reception quality information) of each interference signal back to the connecting base station 200, so that the connecting base station 200 may determine ordering, based on CQI, in consideration of resource assignment status, MCS, rank and the like so as to notify the user apparatus 100 of the ordering.

In this case, the connecting base station 200 calculates α and β for each interference signal as mentioned above, calculates α+β+CQI for each interference signal to perform ordering in a descending order.

Second Embodiment

The user apparatus 100 may perform cancellation processing on all of the interference signals based on the result of ordering obtained by the method described so far. However, especially when the number of the interference signals is large, it can be considered that process load increases. Thus, in the present embodiment, interference signals for which replica subtraction by SIC is to be performed are restricted. In the following, each method is described.

In the following example, in a case where the user apparatus 100 uses information such as TM (Transmission mode), a transmission method and a use reference signal and the like of an interference signal, the connecting base station 200, for example, obtains these pieces of information from an interference base station, and these pieces of information are transmitted to the user apparatus 100. Or, the user apparatus 100 estimates these pieces of information. Also, in a case where the number of interference signals for which replica subtraction is performed becomes 0, the user apparatus 100 performs reception processing other than SIC such as MMSE reception processing and IRC reception processing, for example.

Example 2-1: Restrict to Upper Level Signals of Ordering Result

In the example 2-1, the user apparatus 100 performs an ordering process described in the first embodiment, and determines targets of subtraction by SIC to be only upper level signals from among results of ordering (a plurality of ordered signals). For example, the user apparatus 100 performs subtraction only for top 2 signals in the ordered signals. At the time point when the user apparatus 100 completes subtraction of the 2 signals, the user apparatus 100 performs demodulation and decoding of the desired signal.

Example 2-2: Restrict to Signals Whose RSRP/output SINR/BER is Equal to or Greater Than Threshold In the example 2-2, the user apparatus 100 performs ordering processing described in the first embodiment. Then, the user apparatus 100 determines targets of subtraction to be interference signals, from among results of ordering (a plurality of ordered signals), in which RSRP, output STNR, BER or the like calculated in the ordering process is equal to or greater than a threshold. RSRP, output SINR, and BER can be collectively referred to as reception quality. Also, "BER is equal to or greater than a threshold" means that goodness of quality of BER is equal to or greater than a threshold, and means that actual value of BER is equal to or less than a threshold.

Example 2-3: Restrict to Signals of Low Modulation Scheme

In the example 2-3, the user apparatus 100 determines targets of subtraction to be only interference signals of low MCS (the MCS is predetermined). The low MCS is, for example, an MCS corresponding to a modulation scheme (example: QPSK) of a low multilevel number. Also, only interference signals of low MCS (the MCS is predetermined) may be determined as targets of measurement (RSRP, output SINR, BER).

Example 2-4: Restrict to Signals of Low Rank

In the example 2-4, the user apparatus 100 determines targets of subtraction to be only interference signals of a predetermined low rank (rank 1 for example). Also, only interference signals of a predetermined low rank (rank 1 for example) may be determined to be targets of measurement (RSRP, output SINR, BER).

Example 2-5: Restrict to Signals in Which Similar TM/transmission Method is Used In the example 2-5, only interference signals in which TM/transmission method is the same as or is similar to that of the desired signal are determined to be targets of replica subtraction. The reason is that, in a case where TM/transmission method is the same or similar, it can be expected to improve accuracy of interference cancellation. The example described below for determining by using a reference signal is an example in which restriction is performed for signals of similar transmission method.

For example, only an interference signal transmitted using a TM the same as that for the desired signal is determined to be an interference signal for which subtraction is to be performed. For example, when the user apparatus 100 ascertains that TM of a desired signal which is a target of SIC is TM3, the user apparatus 100 determines that an interference signal transmitted by TM3 is a measurement target and that an interference signal other than TM3 is not a measurement target. By determining the interference signal other than TM3 not to be a measurement target of reception quality, the interference signal does not become an ordering target. Or, in the stage of ordering, a process may be performed in which only interference signal transmitted by TM3 is made to be a target for ordering.

Also, a control may be performed in which only an interference signal that is transmitted by a transmission method the same as that of the desired signal is determined to be an interference signal for which subtraction is performed. For example, when the user apparatus 100 ascertains that the transmission method of a desired signal which is a target of SIC is "open loop transmission diversity (SFBC)", the user apparatus 100 determines that an interference signal transmitted by "open loop transmission diversity (SFBC)" is a measurement target of reception quality (RSRP and the like) and that an interference signal transmitted by a transmission method other than "open loop transmission diversity (SFBC)" is not a measurement target of reception quality. Or, in the stage of ordering, a process may be performed in which only interference signal transmitted by "open loop transmission diversity (SFBC)" is made to be a target for ordering.

As for methods for identifying a transmission method, "open loop transmission diversity (SFBC)" and the like may be directly identified or estimated from notification information and the like, or may be identified based on TM, rank number, the number of antennas and the like. For example, SFBC is used in TM2, and also SFBC is used in the case of TM3 and Rank-1. So, when TM of a desired signal is TM2, it can be determined that an interference signal of TM2 or an interference signal of TM3 and Rank-1 is the same as the desired signal in the transmission method.

Also, a control may be performed in which only an interference signal for which a reference signal used for demodulation of data is the same as that of a desired signal is determined to be an interference signal for which subtraction is performed. For example, when the user apparatus 100 ascertains that the reference signal used by a desired signal which is a target of SIC is "DM-RS", the user apparatus 100 determines that an interference signal that uses "DM-RS" for data demodulation is a measurement target of reception quality (RSRP and the like) and that an interference signal that uses a reference signal other than "DM-RS" for data demodulation is not a measurement target of reception quality. Or, in the stage of ordering, a process may be performed in which only interference signal using "DM-RS" is made to be a target for ordering.

As for methods for identifying a reference signal, "DM-RS" and the like may be directly identified or estimated from notification information and the like, or may be identified based on TM and the like. For example, since demodulation is performed by using CRS in TM1-TM6, when a desired signal is any one of TM1-TM6, it can be determined that an interference signal transmitted by any one of TM1-TM6 uses the same reference signal as that of the desired signal.

For example, since demodulation is performed by using DM-RS in TM8-TM10, when a desired signal is any one of TM8-TM10, it can be determined that an interference signal transmitted by any one of TM8-TM10 uses the same reference signal as that of the desired signal.

In the example of using TM, following is a reason that, when TM is the same between the desired signal and the interference signal, the interference signal is made to be a target of SIC processing, and when TM is different, the interference signal is not made to be a target of SIC processing.

For reducing signaling overhead, it is desirable that information (interference control information) used for SIC processing can be blindly estimated in the user apparatus 100 side to some extent. However, when TM is different between the interference signal and the desired signal, there is a possibility that accuracy of blind estimation is not good.

That is, the blind estimation accuracy of interference control information is largely affected by channel estimation accuracy of the interference signal. Generally, in a case where received power of the interference signal is smaller than that of the desired signal, channel estimation accuracy of the interference signal is not good. However, for example, when both of the desired signal and the interference signal use TM9, the resource of DM-RS for channel estimation is the same. Thus, it is possible to improve estimation accuracy by performing channel estimation for the interference signal after subtracting DM-RS replica of the desired signal from the received signal (DM-RS canceller).

On the other hand, for example, when the desired signal is TM4 (CRS-based) and the interference signal is TM9 (DMRS-based), the resources of the reference signals for channel estimation are not the same. Thus, it is difficult to improve channel estimation accuracy by the above-mentioned canceller, so that blind estimation accuracy cannot be improved.

If blind estimation is not correct (for example, erroneous decision of PMI of interference signal), estimation accuracy of interference replica in SIC processing is deteriorated, so that there is a possibility that characteristics of interference reduction processing may be deteriorated compared to a conventional receiver. Therefore, it is possible to reduce overhead and to suppress deterioration of system performance by not performing SIC processing when different TMs are used.

Example 2-6: Restrict to Signals That are Synchronized with the Desired Signal

In the example 2-6, only an interference signal synchronized with a desired signal is determined to be a target for subtraction. The reason is that, when they are synchronized, it can be expected to improve accuracy of interference canceling.

In the example 2-6, the user apparatus 100 may estimate which interference signal is synchronized with the desired signal, or the user apparatus 100 may determine which interference signal is synchronized with the desired signal by receiving auxiliary information indicating synchronous/asynchronous for each interference signal (each interference cell) from the connecting base station 200.

In a case where the user apparatus 100 performs estimation, for example, the user apparatus 100 determines that the desired signal and the interference signal are synchronized with each other when a received timing difference between a synchronization signal (example: PSS/SSS) received from the connecting base station 200 and a synchronization signal received from an interference base station (interference cell) that transmits the interference signal is equal to or less than a predetermined threshold, so that the user apparatus 100 determines the interference signal to be a measurement target of reception quality (RSRP and the like). Also, when the received timing difference is greater than a predetermined threshold, it is determined that the desired signal and the interference signal are not synchronized with each other, and the interference signal is not used as a measurement target of reception quality. By not using as a measurement target of reception quality, the interference signal does not become a target for ordering. Restriction of interference signals may be performed in the stage of ordering.

As the threshold for determining synchronous/asynchronous, for example, "30.16 μsec" which is used for determining synchronization between CCs in carrier aggregation can be used. Also, "30.26+X μsec" (X value is a predetermined value) which is used for determining inter-cell synchronization in Dual connectivity may be used.

Example 2-7: Combination

The above-mentioned examples 2-1-2-6 may be used independently, or may be used by combining a plurality ones. For example, when the example 2-2 and example 2-4 are combined, a low rank interference signal in which RSRP, output SINR or the like is equal to or greater than a threshold is determined to be a target of subtraction.

Example 2-8: Notification of Signal and the Like for Which SIC Processing Should Be Performed From Connecting Base Station There are 4 concrete examples (a)-(d) in the example 2-8. In the following, each of them is described.

(a) Notification by Bitmap

In the example 2-8(a), the connecting base station 200 determines an interference signal that should be subtracted in SIC in the user apparatus 100, and dynamically notifies the user apparatus 100 of information indicating the determined interference signal by PDCCH. The notification may be performed semistatically. For example, the connecting base station 200 notifies the user apparatus 100 of interference signals on which SIC processing should be performed by a bitmap.

For example, the connecting base station 200 calculates α and β for each interference signal by the following formula, determines an interference signal which satisfies α+β> (threshold E) to be an interference signal that should be subtracted, and designates bit 1 for the interference signal. The connecting base station 200 determines other interference signals to be interference signals for which subtraction processing is not performed, and designates bit 0. The fact that the value of α+β is large indicates that the interference cancelling effect by SIC is high.

α=(probability of QPSK)×$A$+(probability of 16QAM)×$B$

β=(probability of rank 1)×$C$+(probability of rank 2)×$D$

In each of the above formulas, A, B, C, D, and E are constants, and A>B and C>D hold true.

Figure 7:
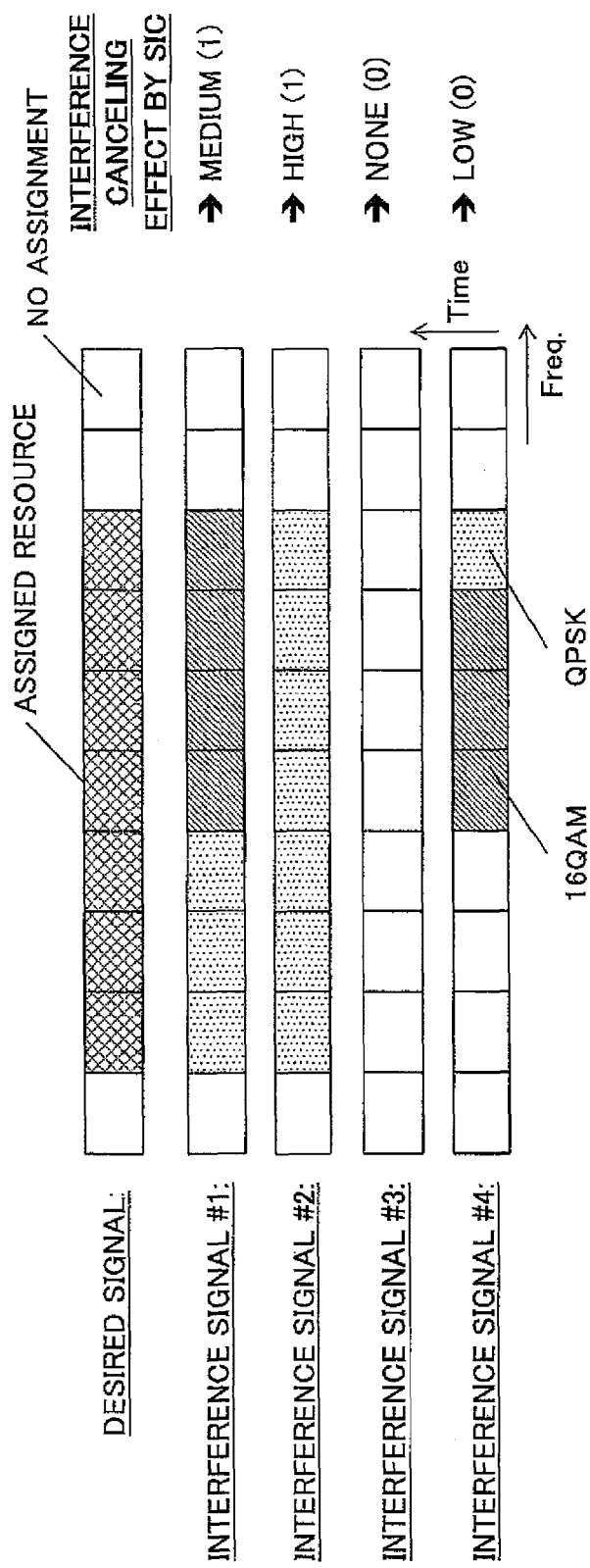
FIG. 7 is a diagram for explaining a notification content example in a case where signals for which SIC processing should be performed are reported from the connecting base station 200.

An example is shown in FIG. 7. In this example, as for an interference signal #1 and an interference signal #2, since α+β exceeds a threshold, 1 is set. As for an interference signal #3 and an interference signal #4, 0 is set.

In the case of this example, the connecting base station 200 notifies the user apparatus 100 of 1100 as a bitmap. Here, the use apparatus 100 is notified of information of interference signals (neighbor cells) beforehand from the connecting base station 200 and the like, so that the user apparatus 100 can identify an interference signal corresponding to a bit position in the bitmap information. The connecting base station 200 may obtain and such neighbor cell information from a neighbor base station to transmit the neighbor cell information. Or, information of existing signaling for transmitting neighbor cell information, such as DCI or RRC signaling used in QCL (Quasi Co-location), may be used.

The user apparatus 100 receives the bitmap 1100 to perform subtraction processing only for the interference signals #1 and #2. Also, the user apparatus 100 may perform measurement (RSRP, output SINR and the like) only for interference signals to which 1 is designated in the bitmap.

(b) Notification of the Number of Interference Signals

In the example 2-8 (b), the connecting base station 200 determines the number of interference signals that should be subtracted in SIC in the user apparatus 100, and dynamically or semistatically notifies the user apparatus 100 of the determined number of the interference signals. Although the method by which the connecting base station 200 determines the number of interference signals is not limited to a particular method, for example, the connecting base station 200 can notify of the number of interference signals that satisfy the condition by the calculation described in the example 2-8(a). Also, the connecting base station 200 may notify of the number of interference signals synchronized with the desired signal, or the number of interference signals whose TM is the same as that of the desired signal.

The user apparatus 100 that receives the above-mentioned number determines only the notified number of upper level interference signals to be targets of ordering. For example, in the case of example 1-1, when the notified number is 2, the user apparatus 100 determines an interference signal of the highest RSRP and an interference signal of the next highest to be targets of ordering. Also, without performing determination of the upper level and the like, the user apparatus 100 may perform measurements for the notified number of arbitrary interference signals, and determine the interference signals to be targets of ordering. Also, when the connecting base station 200 notifies of "0" as the number, since the number of target interference signal is 0, the user apparatus 100 does not perform SIC.

(c) Signaling Only Control Information of Interference Signals for Which SIC Processing Should Be Performed.

In the example 2-8(c), the connecting base station 200 determines interference signals that should be subtracted in SIC by the user apparatus 100, and notifies the user apparatus 100 of control information only of the determined interference signals dynamically or semistatically.

Although the method for determining, by the connecting base station 200, interference signals for which SIC processing should be performed is not limited to a particular method, for example, control information of interference signals that satisfy the condition by calculation described in the example 2-8(a) can be transmitted. Also, control information of interference signals synchronized with the desired signal, or control information of interference signals in which TM is the same as that of the desired signal may be transmitted.

In the example of transmitting control information of transmission signals synchronized with the desired signal, for example, the connecting base station 200 holds a list of interference signals (interference cells) synchronized with the desired signal (connecting cell) for the user apparatus 100, and transmits, by signaling, control information (RS information, modulation scheme information and the like) of only interference signals synchronized with the desired signal dynamically or semistatically.

In the example of transmitting control information of interference signals in which TM is the same as that of the desired signal, for example, the connecting base station 200 holds TMs of each interference signal by obtaining them from interference base stations, determines interference signals in which TM is the same as that of the desired signal, and transmits, by signaling, only control information of the interference signals dynamically or semistatically.

(d) OFF Notification of SIC

In the example 2-8(d), for example, when the connecting base station 200 determines that SIC should not be performed in the user apparatus 100 for any interference signal, the connecting base station 200 transmits explicit notification indicating that SIC should be OFF to the user apparatus dynamically or semistatically. The user apparatus 100 that receives the OFF notification performs reception processing other than SIC, that is, for example, MMSE reception processing or IRC reception processing. Also, for example, when control information of an interference signal is newly notified, the user apparatus 100 may apply SIC by using the control information.

Although a method for determining whether to perform SIC or not is not limited to a particular method, for example, OFF notification may be performed, by applying the before-mentioned determination of TM or synchronous/asynchronous, when TM of every interference signal is different from TM of the desired signal or when every interference signal is asynchronous with the desired signal.

Any one of the examples 2-1-2-7 or a plurality of any ones of the examples 2-1-2-7 may be combined with the example 2-8. For example, the user apparatus 100 may perform ordering, as described in the first embodiment, for a plurality of interferences signals of bit 1 reported from the connecting base station 200, and may perform the subtraction processing on a predetermined number of upper level interferences signals in the plurality of interferences signals.

(Apparatus Configuration, Process Flow)

In the following, apparatus configurations and process sequence examples for executing processes in the first embodiment and the second embodiment are described. In each block diagram below, necessity of output information corresponding to each of the before-mentioned examples is described. For example, when "only when grouping interference signals" is described, it indicates that the information (and corresponding functional unit) is necessary only when interference signals are grouped.

Also, each configuration example only shows functional units that especially correspond to process content of each example, and each apparatus may include functions, not shown in the figure, necessary for performing actual SIC processing and the like.

<Apparatus Configuration Example, Operation Example for Performing RSRP Based Ordering>

Figure 8:
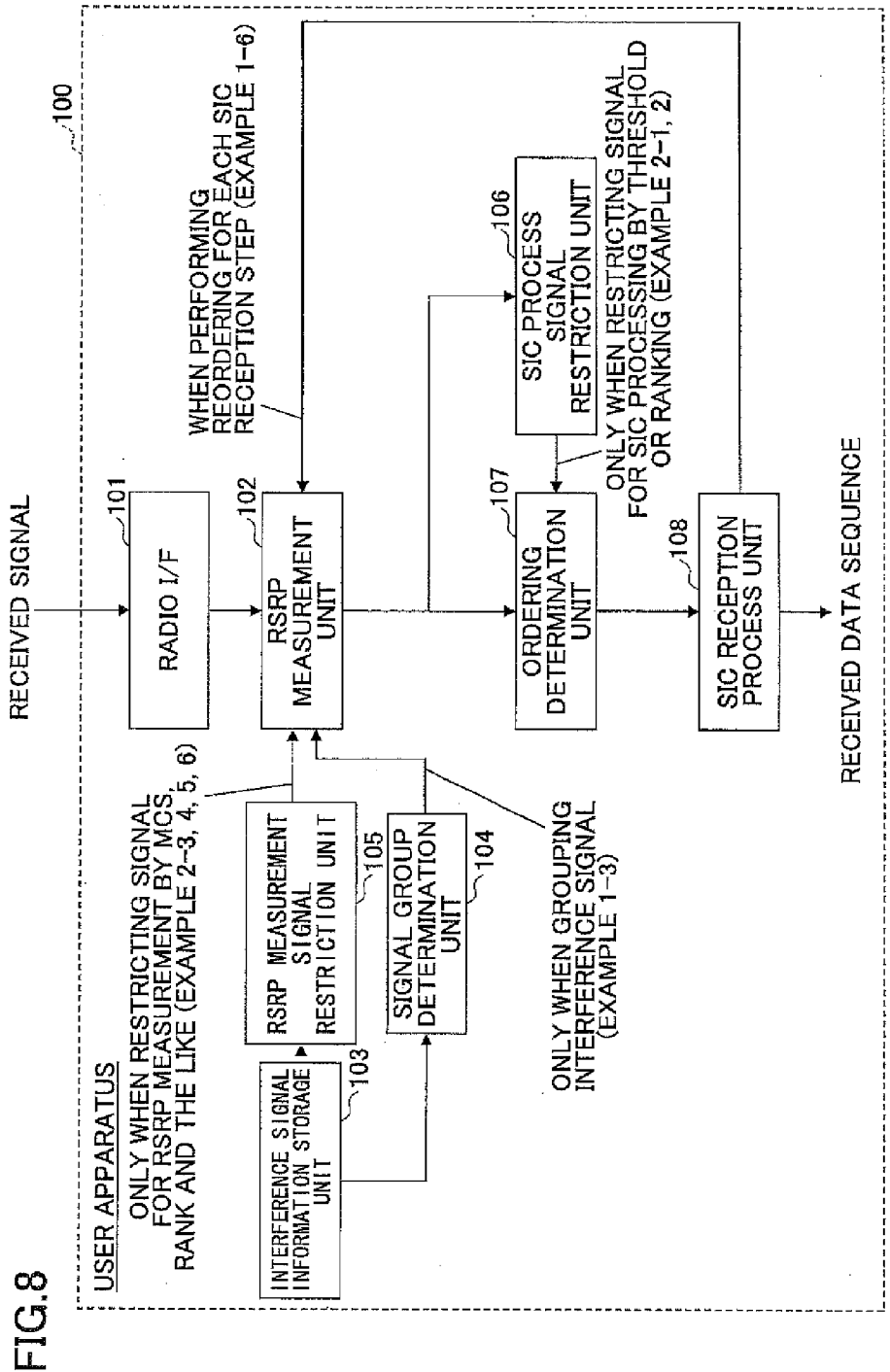
FIG. 8 is a diagram showing a configuration example of a user apparatus 100 that performs RSRP based ordering.

FIG. 8 shows a configuration example of the user apparatus 100 configured to perform RSRP based ordering. As shown in FIG. 8, the user apparatus 100 of this example includes a radio I/F 101, an RSRP measurement unit 102, an interference signal information storage unit 103, a signal group determination unit 104, an RSRP measurement signal restriction unit 105, a SIC process signal restriction unit 106, an ordering determination unit 107, and a SIC reception process unit 108.

The radio I/F 101 is a radio interfere configured to perform transmission and reception of a signal with a base station and the like. By the way, since the radio I/F is similar in each configuration example, explanation is not provided in other configuration examples. The RSRP measurement unit 102 estimates (calculates) RSRP from a received signal. The interference signal information storage unit 103 is a memory configured to store information, on an interference signal, transmitted from the connecting base station 200 or estimated by itself. Information on interference signal is rank, MCS that are necessary for performing SIC processing (including ordering), information used for restricting subtraction target (example: TM, synchronous/asynchronous and the like), and other information on interference signals. This also applies similarly to other configuration examples.

The signal group determination unit 104 groups interfere signals based on MCS, rank and the like as described in the example 1-3. The RSRP measurement signal restriction unit 105 restricts the number of signals, for which RSRP measurement is performed, based on MCS or rank of interference signals, TM/transmission method, synchronous/asynchronous and the like. The SIC process signal restriction unit 106 restricts the number of signals for which SIC processing is performed by ranking or by threshold based on measurement result of output SINR or BER. The ordering determination unit 107 determines ordering, for example, in a descending order of RSRP. The SIC reception process unit 108 performs SIC reception processing based on the ordering result. As for restriction of interferences signals for subtraction targets, targets of measurement such as RSRP may be restricted, or in the stage of ordering, target interference signals for ordering may be restricted. This also applies to other configuration examples.

In addition, by receiving signals corresponding to examples 2-8 (b)-(d), the user apparatus 100 can perform processes such as ordering of only the notified number of interference signals, ordering of only interference signals corresponding to notified control information, no SIC processing, and the like. This also applies to other configuration examples.

Figure 9:
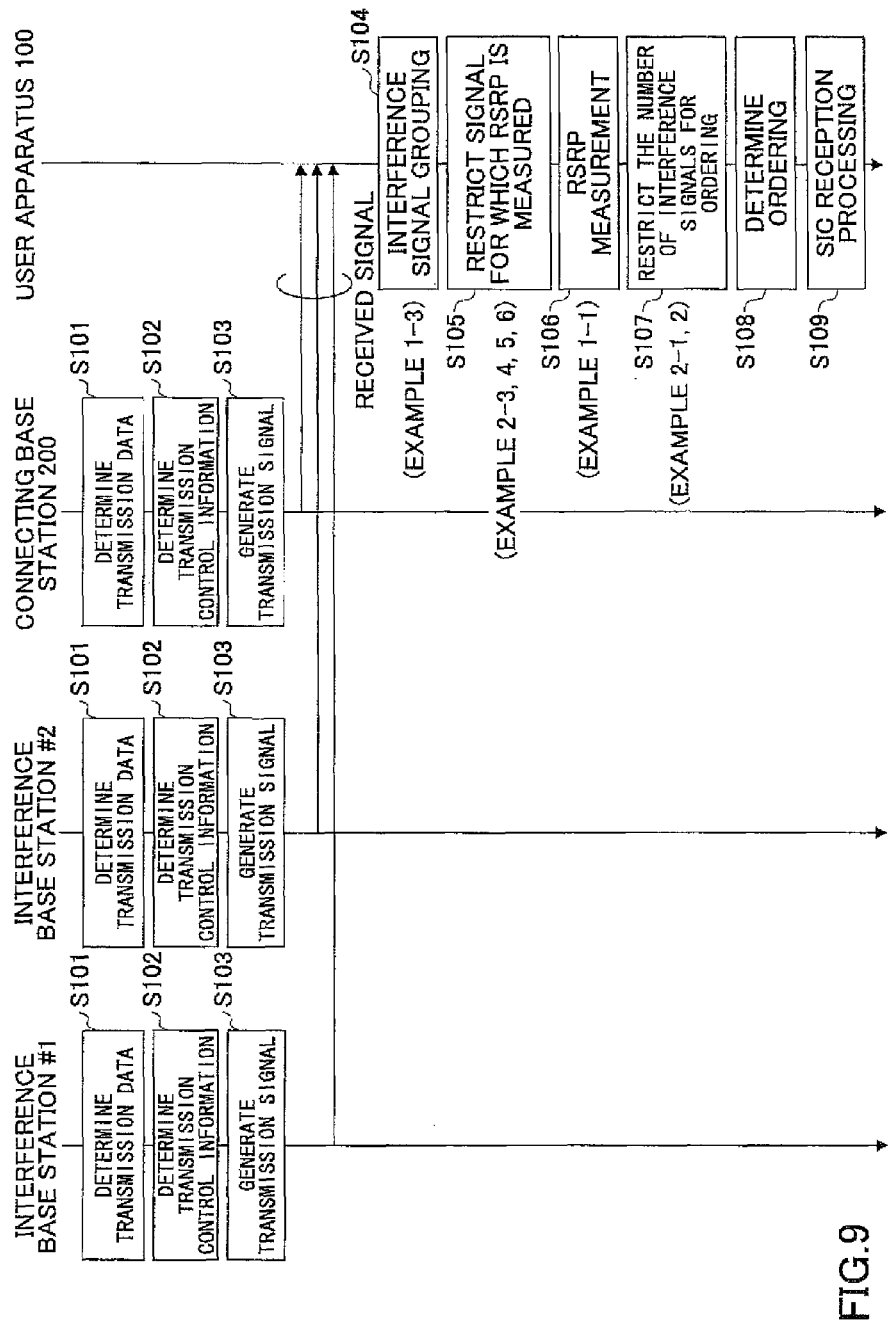
FIG. 9 is a diagram of a process sequence example in a case where RSRP based ordering is performed.

FIG. 9 shows a process sequence example in a case where RSRP based ordering is performed. In FIG. 9, as an example, two interference base stations are shown. This also applies to other process sequence examples.

As shown in FIG. 9, each base station determines transmission data (step 101), determines transmission control information (example: assignment resource, MCS, rank and the like), and generates and transmits a transmission signal (step 103). The user apparatus 100 receives signals transmitted from each base station.

In this example, the user apparatus 100 performs grouping of interference signals by the signal group determination unit 104 (step 104), and restricts signals for which RSRP is measured by the RSRP measurement signal restriction unit 105 (step 105). Next, the RSRP measurement unit 102 measures RSRP of signals of measurement target (step 106), the SIC process signal restriction unit 106 restricts the number of interference signals for ordering (that is, used for subtraction) (step 107), the ordering determination unit 107 determines ordering (step 108), and the SIC reception process unit 108 performs SIC reception processing based on the determined ordering (step 109).

<Apparatus Configuration Example, Operation Example for Performing Output SINR/BER Based Ordering>

Figure 10:
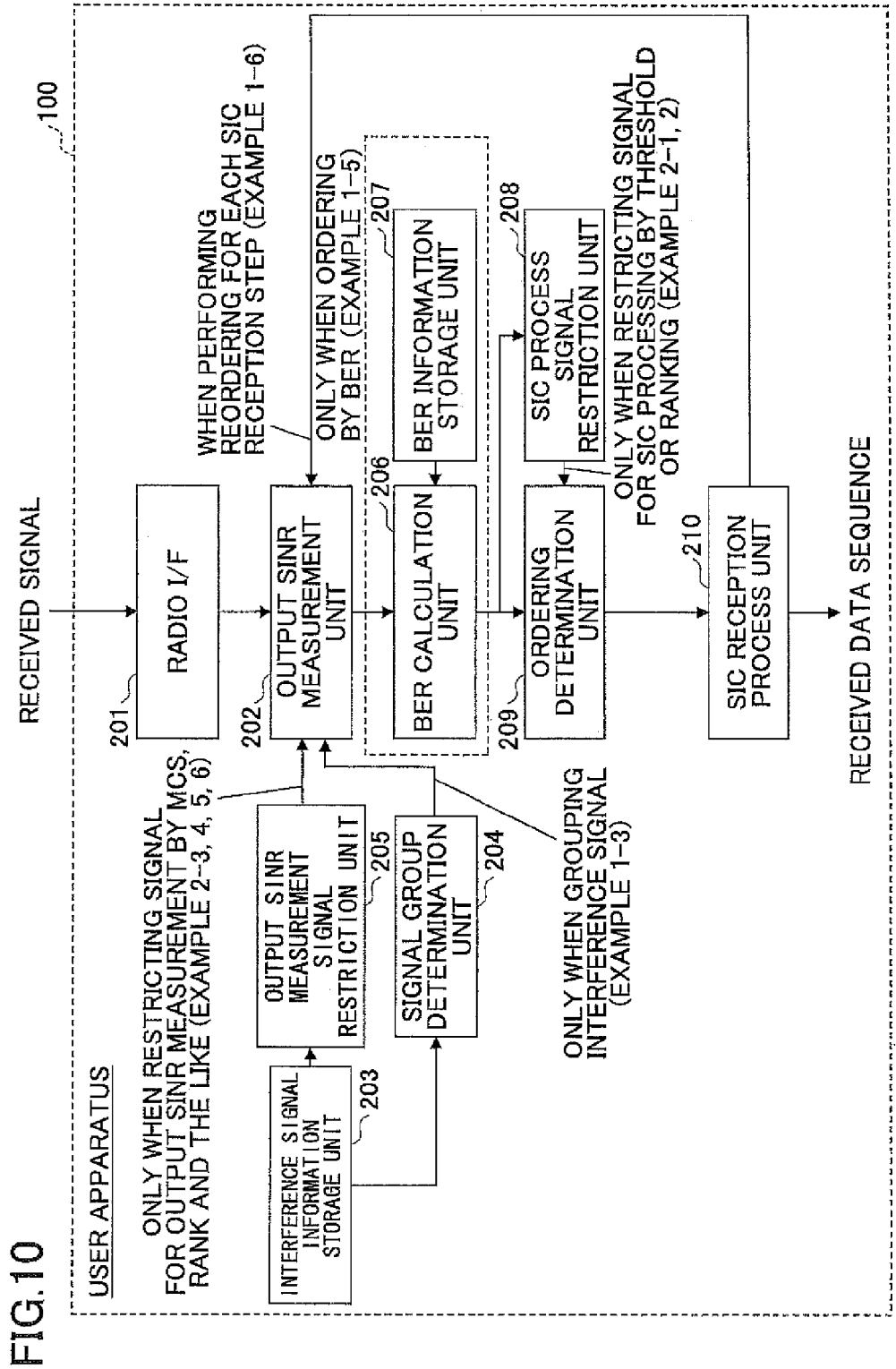
FIG. 10 is a diagram showing a configuration example of a user apparatus 100 that performs output SINR/BER based ordering.

FIG. 10 shows a configuration example of the user apparatus 100 configured to perform output SINR/BER based ordering. As shown in FIG. 10, the user apparatus 100 of this example includes a radio I/F 201, an output SINR measurement unit 202, an interference signal information storage unit 203, a signal group determination unit 204, an output SINR measurement signal restriction unit 205, a BER calculation unit 206, a BER information storage unit 207, a SIC process signal restriction unit 208, an ordering determination unit 209, and a SIC reception process unit 210.

The output SINR measurement unit 202 estimates SINR after IRC reception processing from a received signal. The interference signal information storage unit 203 is a memory configured to store information, on an interference signal, transmitted from the connecting base station 200 or estimated by itself. The signal group determination unit 204 groups interference signals based on MCS, rank and the like. The output SINR measurement signal restriction unit 205 restricts the number of signals, for which output SINR measurement is performed, based on MCS or rank of interference signals, TM/transmission method, synchronous/asynchronous and the like.

The BER calculation unit 206 calculates BER from the measured output SINR. The BER information storage unit 207 is a memory configured to store BER for each MCS. The SIC process signal restriction unit 208 restricts signals for which SIC processing is performed by ranking or by threshold based on the measurement result of output SINR or BER. The ordering determination unit 209 determines ordering. The SIC reception process unit 210 performs SIC reception processing based on the ordering result.

Figure 11:
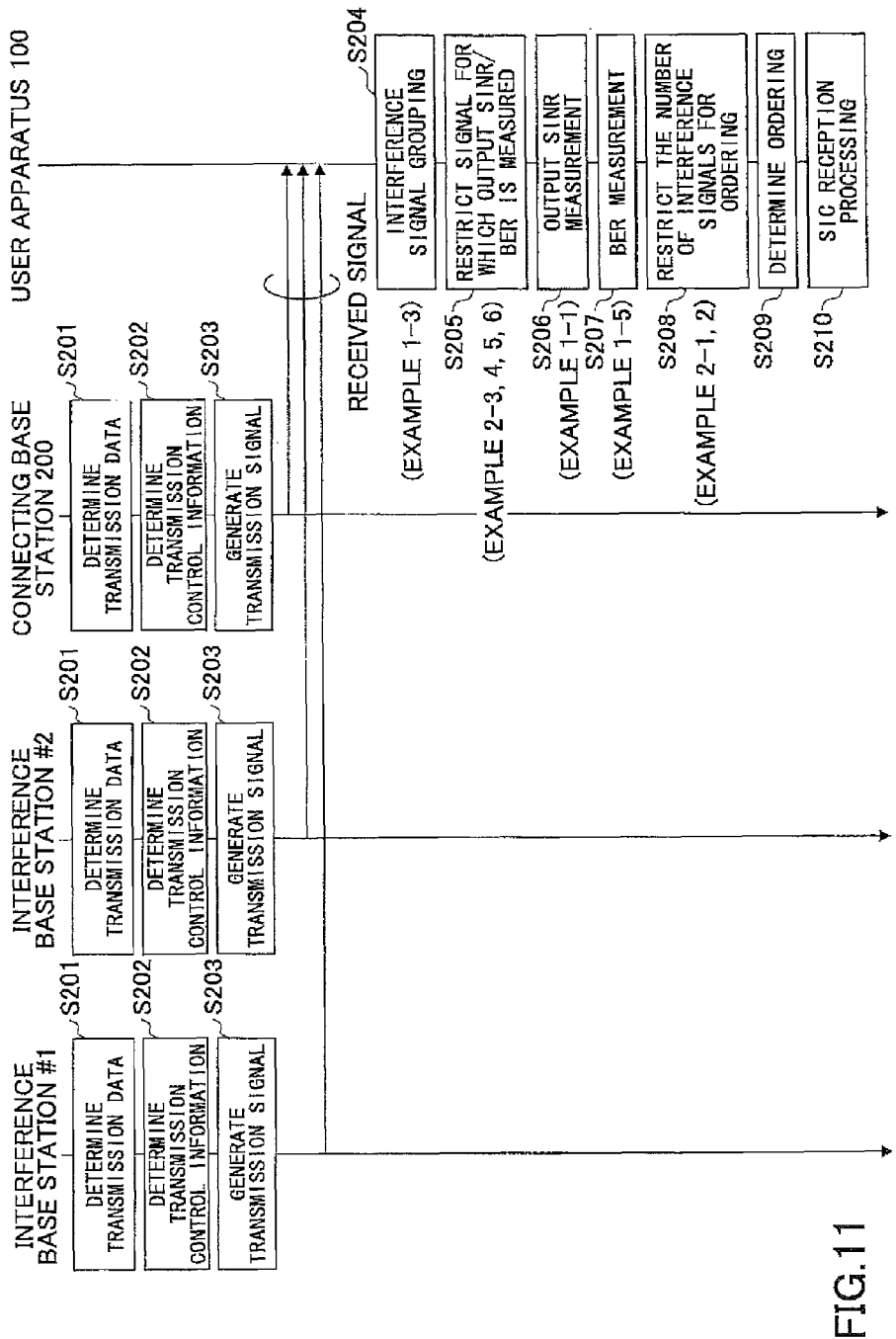
FIG. 11 is a diagram of a process sequence example in a case where output SINR/BER based ordering is performed.

FIG. 11 shows a process sequence example in a case where output SINR/BER based ordering is performed.

First, transmission signals are generated in the same way as the case shown in FIG. 9, and the signals are transmitted to the user apparatus 100. In this example, the user apparatus 100 performs grouping of interference signals by the signal group determination unit 204 (step 204), and restricts signals for which output SINR/BER is measured are restricted by the output SINR measurement signal restriction unit 205 (step 205). Next, the output SINR measurement unit 202 measures output SINR for signals of measurement target (step 206). Also, the BER calculation unit 206 calculates BER (step 207).

Then, the SIC process signal restriction unit 208 restricts the number of interference signals for ordering (that is, used for subtraction) (step 208), the ordering determination unit 209 determines ordering (step 209), and the SIC reception process unit 210 performs SIC reception processing based on the determined ordering (step 210).

<Apparatus Configuration Example, Operation Example for Performing RSRP Based Ordering By Using Auxiliary Information From the Connecting Base Station 200>

Figure 12:
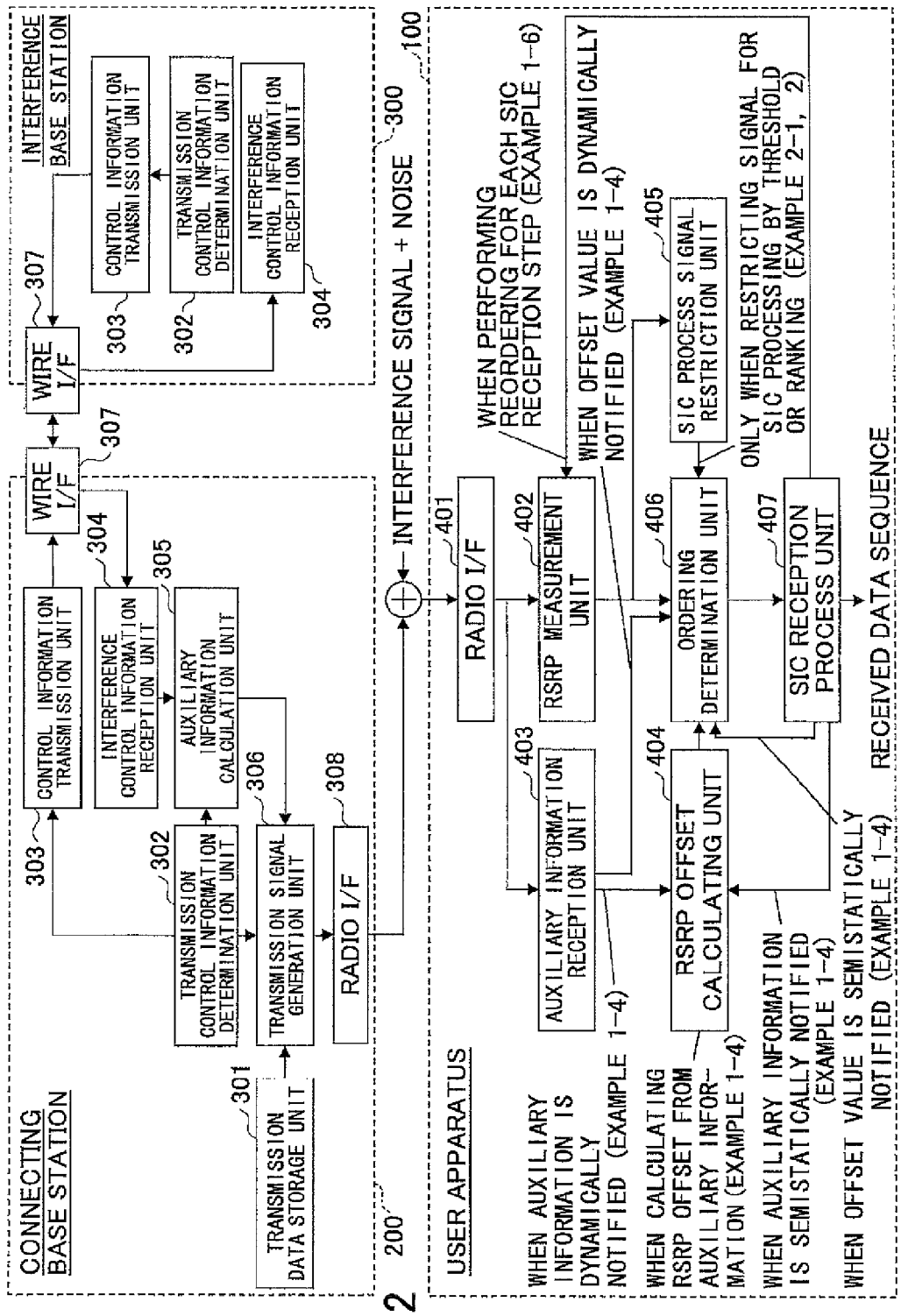
FIG. 12 is a diagram showing a system configuration example in a case where RSRP based ordering is performed by using auxiliary information from the connecting base station 200.

FIG. 12 shows a system configuration example for performing RSRP based ordering by using auxiliary information from the connecting base station 200.

As shown in FIG. 12, the connecting bases station 200 of this example includes a transmission data storage unit 301, a transmission control information determination unit 302, a control information transmission unit 303, an interference control information reception unit 304, an auxiliary information calculation unit 305, a transmission signal generation unit 306, a wire I/F 307, and a radio I/F 308. Although other base stations includes similar configuration, FIG. 12 shows one interference base station 300, and a part of the configuration is shown. This also applies to other configurations.

The transmission data storage unit 301 is a memory configured to store data for transmission. The transmission control information determination unit 302 determines control information (MCS, scheduling and the like) of a transmission signal of the connecting base station 200 (own base station). The control information transmission unit 303 transmits control information of the connecting base station 200 (own base station) to another base station.

The interference control information reception unit 304 receives control information from another base station (interference base station 300). The auxiliary information calculation unit 305 calculates auxiliary information based on assignment of interference signals in assignment resources of itself, MCS, rank and the like. The transmission signal generation unit 306 generates a signal for transmission (including auxiliary information). The wire I/F 307 (this may be replaced with radio) is an interfere for communicating with another base station, and the radio I/F 308 is an interface for communicating with the user apparatus 100. Since these interfaces are similar to other configuration examples, the explanation of these are not provided in other configuration examples.

The user apparatus 100 of this example includes a radio I/F 401, an RSRP measurement unit 402, an auxiliary information reception unit 403, an RSRP offset calculation unit 404, a SIC process signal restriction unit 405, an ordering determination unit 406, and a SIC reception process unit 407.

The RSRP measurement unit 402 estimates (calculates) RSRP from a received signal. The auxiliary information reception unit 403 receives auxiliary information from the connecting base station 200. The RSRP offset calculation unit 404 calculates an offset value based on the auxiliary information as described in the example 1-4, for example.

The SIC process signal restriction unit 405 determines signals for which SIC processing is performed by ranking or by threshold based on measurement result of RSRP. The ordering determination unit 406 determines ordering, and the SIC reception process unit 407 performs SIC reception processing based on the ordering result.

Figure 13:
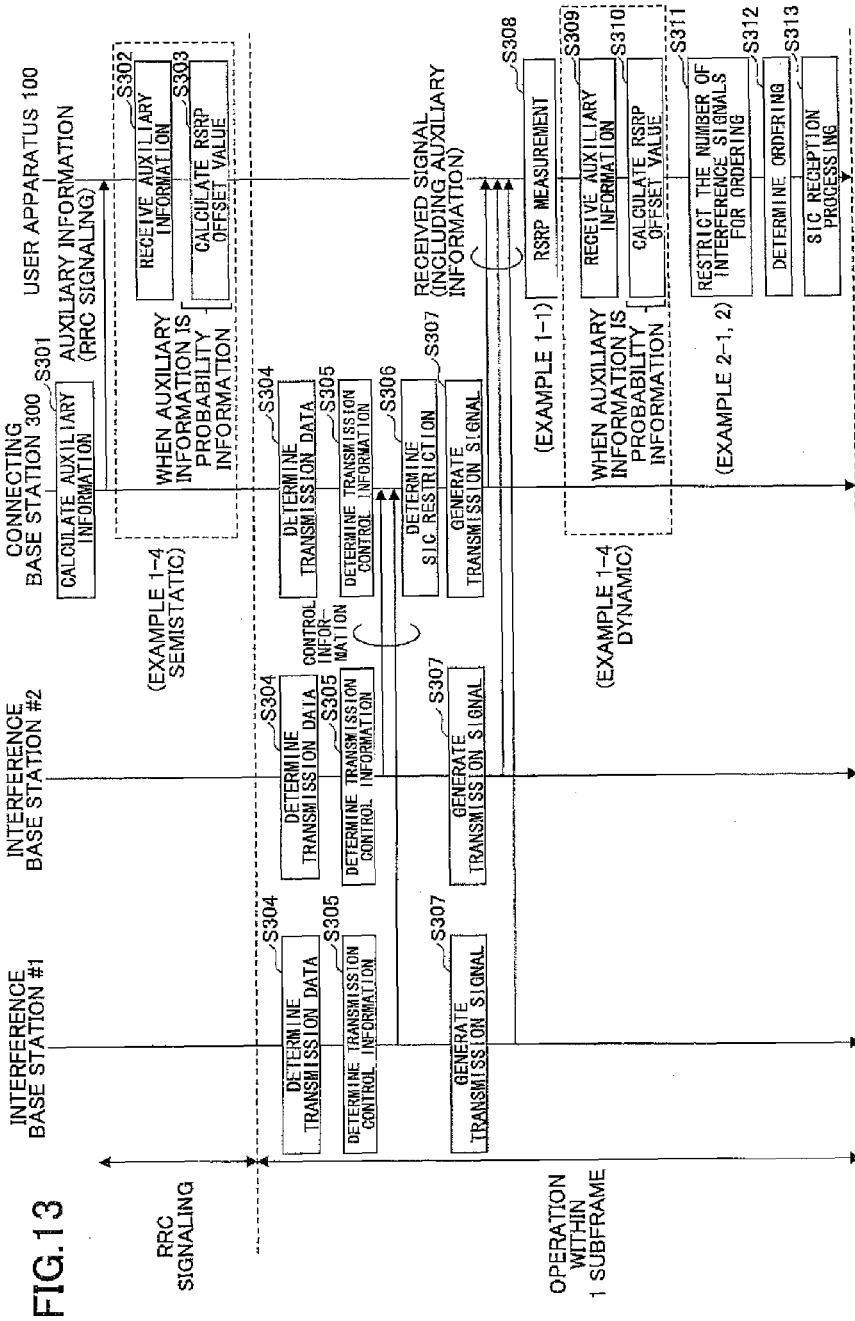
FIG. 13 is a diagram showing a process sequence example in a case where RSRP based ordering is performed by using auxiliary information from the connecting base station 200.

FIG. 13 shows a process sequence example in a case where RSRP based ordering is performed by using auxiliary information from the connecting base station 200.

The auxiliary information calculation unit 305 of the connecting base station 200 calculates auxiliary information (example: probability information of modulation scheme) (step 301). In the case of semistatic notification, the user apparatus 100 receives auxiliary information (step 302), and calculates an RSRP offset value (step 303).

Each base station determines transmission data (step 304), and determines transmission control information (step 305). The auxiliary information calculation unit 305 of the connecting base station 200 calculates auxiliary information in dynamic notification (step 306), generates and transmits a transmission signal (step 307). The user apparatus 100 receives signals transmitted from each base station.

In the user apparatus 100, the RSRP measurement unit 402 measures RSRP of each signal (step 308), the auxiliary information reception unit 403 receives auxiliary information (step 309). The RSRP offset calculation unit 404 calculates an offset based on the auxiliary information (step 310).

Then, the SIC process signal restriction unit 405 restricts the number of interference signals for ordering (that is, used for subtraction) (step 311), the ordering determination unit 406 determines ordering based on RSRP and offset for each target interference signal (step 312), and the SIC reception process unit 407 performs SIC reception processing based on the determined ordering (step 313).

<Apparatus Configuration Example, Operation Example for Performing RSRP Based Ordering By Notifying of Interference Signals for Which Subtraction is Performed in SIC From the Connecting Base Station 200>

Figure 14:
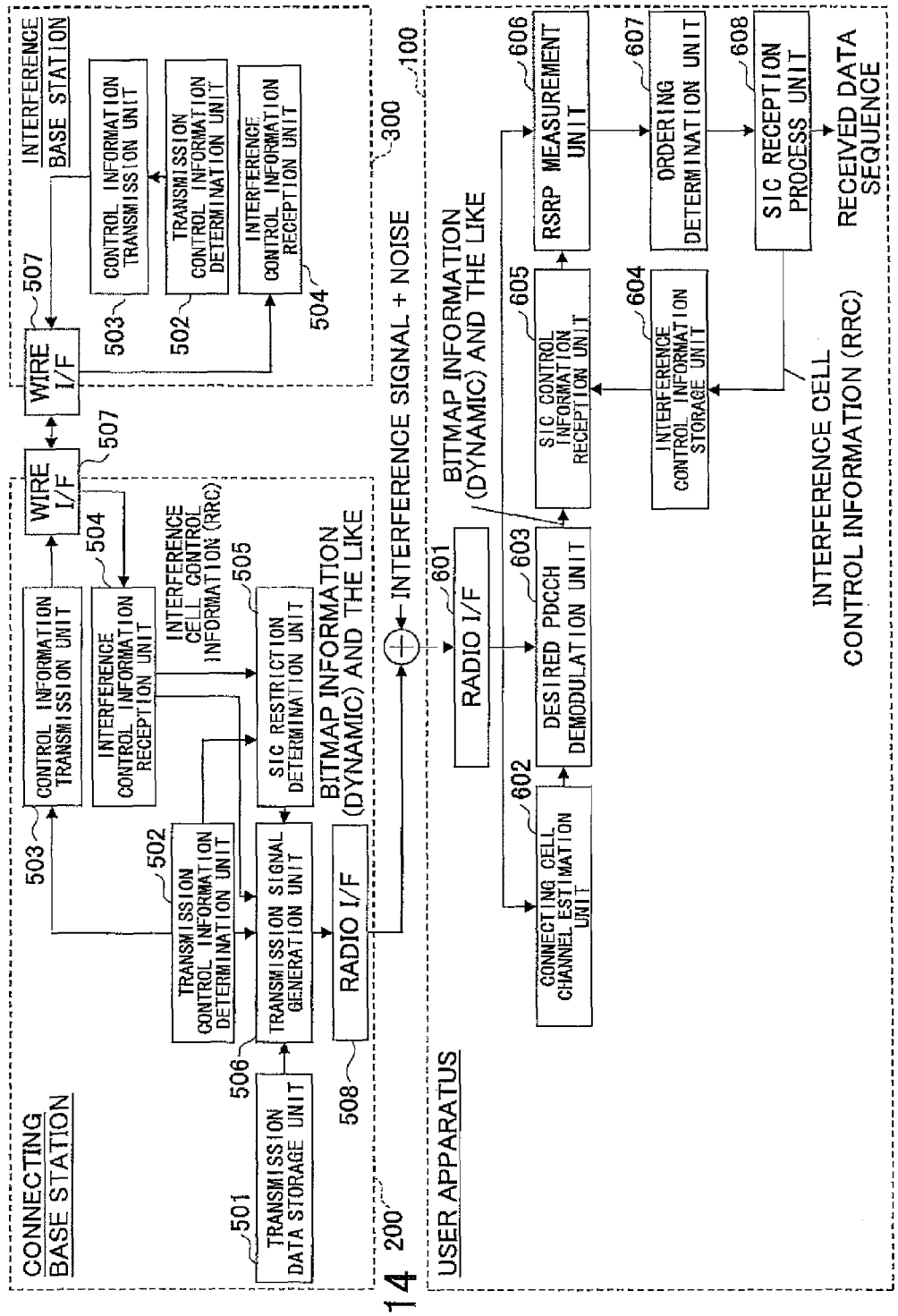
FIG. 14 is a diagram showing a system configuration example in a case where RSRP based ordering is performed by reporting, from the connecting base station 200, interference signals for which subtraction in SIC is performed.

FIG. 14 shows a system configuration example for performing RSRP based ordering by notifying of interference signals for which subtraction is performed in SIC from the connecting base station 200.

As shown in FIG. 14, the connecting base station 200 of this example includes a transmission data storage unit 501, a transmission control information determination unit 502, a control information transmission unit 503, an interference control information reception unit 504, a SIC restriction determination unit 505, a transmission signal generation unit 506, a wire I/F 507, and a radio I/F 508. Other base stations include similar configurations.

The transmission data storage unit 501 is a memory configured to store data for transmission. The transmission control information determination unit 502 determines control information (MCS, scheduling and the like) of a transmission signal of the connecting base station 200. The control information transmission unit 503 transmits control information of the connecting base station 200 to another base station.

The interference control information reception unit 504 receives control information from the interference base station 300. The SIC restriction determination unit 505 generates a bitmap indicating interference signals for which SIC processing should be performed. The transmission signal generation unit 506 generates a signal for transmission. The signal to be transmitted includes the bitmap indicating signals for which SIC process is performed, and interference cell control information (RRC). In a case where operation of the example 2-8(b) is performed, the SIC restriction determination unit 505 calculates the number of interference signals for which SIC processing should be performed, the transmission signal generation unit 506 generates a signal for transmission including the number. In a case where operation of the example 2-8(c) is performed, the SIC restriction determination unit 505 determines interference signals for which SIC processing should be performed, and instructs the transmission signal generation unit 506 to generate a signal including control information of only the interference signals as control information for interference canceling. In a case where operation of the example 2-8(d) is performed, when the SIC restriction determination unit 505 determines that there is no interference signal for which SIC processing should be performed, and the SIC restriction determination unit 505 instructs the transmission signal generation unit 506 to generate a signal including OFF notification of SIC.

The user apparatus 100 of this example is assumed to especially perform operation of the example 2-8 (a), and includes a radio I/F 601, a connecting cell channel estimation unit 602, a desired PDCCH demodulation unit 603, an interference control information storage unit 604, a SIC control information reception unit 605, an RSRP measurement unit 606, an ordering determination unit 607, and a SIC reception process unit 608.

The connecting cell channel estimation unit 602 estimates a channel necessary for demodulating PDCCH of a desired signal from a received signal. The desired PDCCH demodulation unit 603 demodulates PDCCH of a desired signal from a received signal. The interference control information storage unit 604 is a memory configured to store control information of an interference cell (interference base station). The SIC restriction information reception unit 605 receives a bitmap indicating interference signals for which SIC processing should be performed.

The RSRP measurement unit 606 measures RSRP only for interference signals indicated by the bitmap from the received signal. The ordering determination unit 607 determines ordering, and the SIC reception process unit performs SIC reception processing based on the ordering result.

Figure 15:
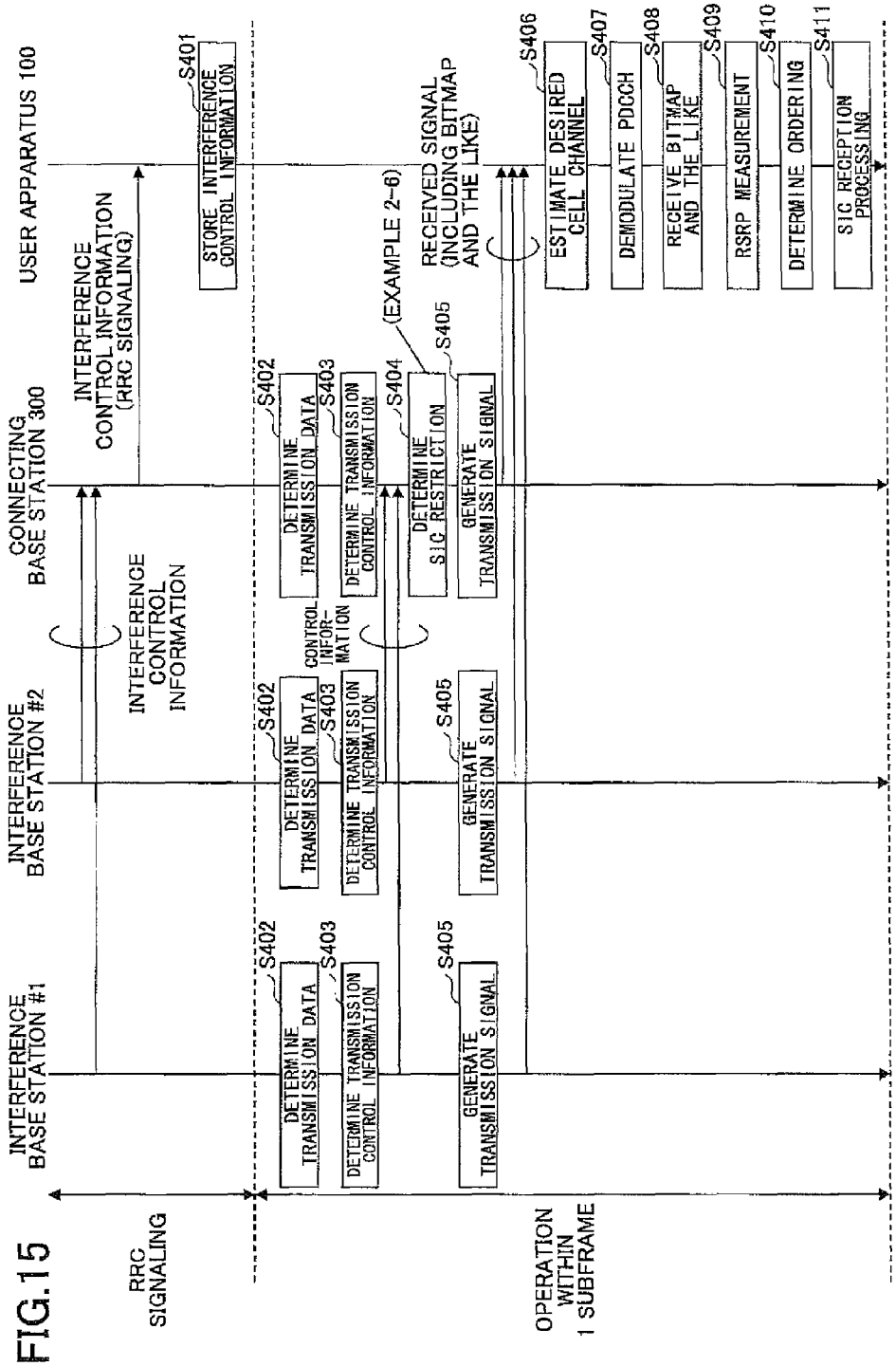
FIG. 15 is a diagram showing a process sequence example in a case where RSRP based ordering is performed by reporting, from the connecting base station 200, interference signals for which subtraction in SIC is performed.

FIG. 15 shows a process sequence example in a case where RSRP based ordering is performed by notifying of interference signals for which SIC is performed from the connecting base station 200.

The connecting base station 200 obtains interference control information from the interference base station, and notifies the user apparatus 100 of the interference control information. In the user apparatus 100, the interference control information is stored in the interference control information storage unit 604 (step 401). This interference control information is used, for example, by the user apparatus 100 for identifying each bit of the bitmap corresponds to which interference signal.

Each base station determines transmission data (step 402), and determines transmission control information (step 403). The SIC restriction determination unit 505 of the connecting base station 200 determines interference signals for which SIC is performed based on interference control information (assigned resource, MCS, rank and the like) received from the interference base station to generate a bitmap (step 404). Also, the SIC restriction determination unit 505 may perform calculation of the number of interference signals, determination of control information to be transmitted, and generation of OFF notification. Each base station generates a transmission signal, and transmit it (step 405). The user apparatus receives signals transmitted from each base station.

In the user apparatus 100, the connecting cell channel estimation unit 602 performs desired cell channel estimation (step 406), the desired PDCCH demodulation unit 603 demodulates PDCCH (step 407). Also, the SIC restriction information reception unit 605 receives a bitmap (step 408). The RSRP measurement unit 606 measures RSRP of each signal for which bit 1 is designated (step 409), the ordering determination unit 607 determines ordering (step 410), and the SIC reception process unit 608 performs SIC reception processing based on the determined ordering (step 411).

<Apparatus Configuration Example, Operation Example for Specifying Ordering to the User Apparatus 100 From the Connecting Base Station 200>

Figure 16:
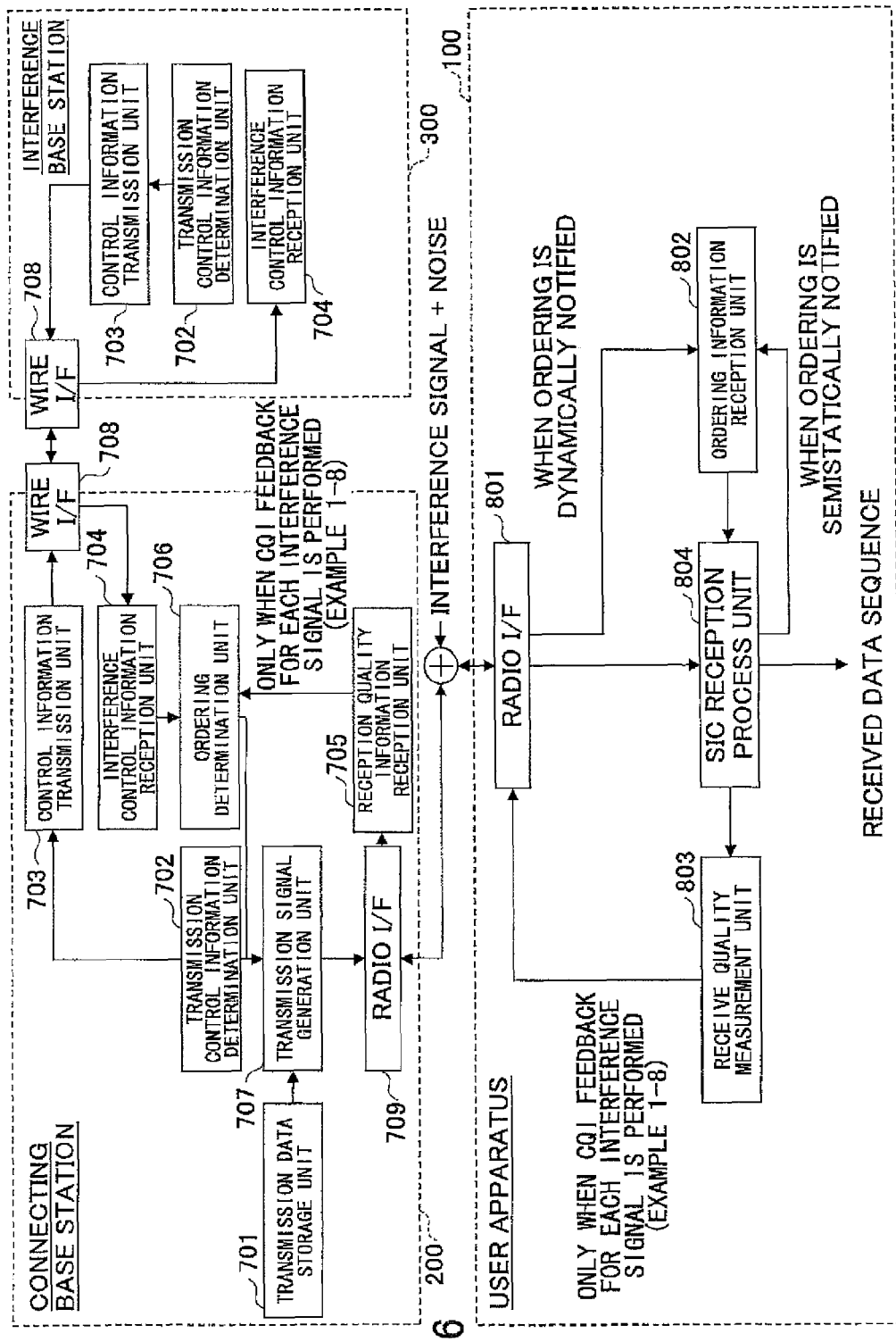
FIG. 16 is a diagram showing a system configuration example in a case where ordering is specified from the connecting base station 200 to the user apparatus 100.

FIG. 16 shows a system configuration example in a case where ordering is specified from the connecting base station 200 to the user apparatus 100.

The connecting base station 200 of this example includes a transmission data storage unit 701, a transmission control information determination unit 702, a control information transmission unit 703, an interference control information reception unit 704, a reception quality information receiving unit 705, an ordering determination unit 706, a transmission signal generation unit 707, a wire I/F 708, and a radio I/F 709. Other base stations include similar configurations.

The transmission data storage unit 701 is a memory configured to store data for transmission. The transmission control information determination unit 702 determines control information (MCS, scheduling and the like) of a transmission signal of the connecting base station 200. The control information transmission unit 703 transmits control information of the connecting base station 200 to another base station. The interference control information reception unit 704 receives control information from interference base station.

The reception quality information receiving unit 705 receives reception receives reception quality (CQI), for each interference signal, fed back from the user apparatus 100.

The ordering determination unit 706 determines ordering from control information of interference cells (+CQI for each interference signal). The transmission signal generation unit 707 generates a signal (including ordering information) for transmission.

The user apparatus 100 includes a radio I/F 801, an ordering information reception unit 802, a reception quality measurement unit 803, and an SIC reception process unit 804.

The ordering information reception unit 802 receives ordering information determined by the connecting base station 200. The reception quality measurement unit 803 measures reception quality information (CQI) for each interference signal. The SIC reception process unit 804 performs SIC reception processing based on the ordering result determined by the connecting base station 200.

Figure 17:
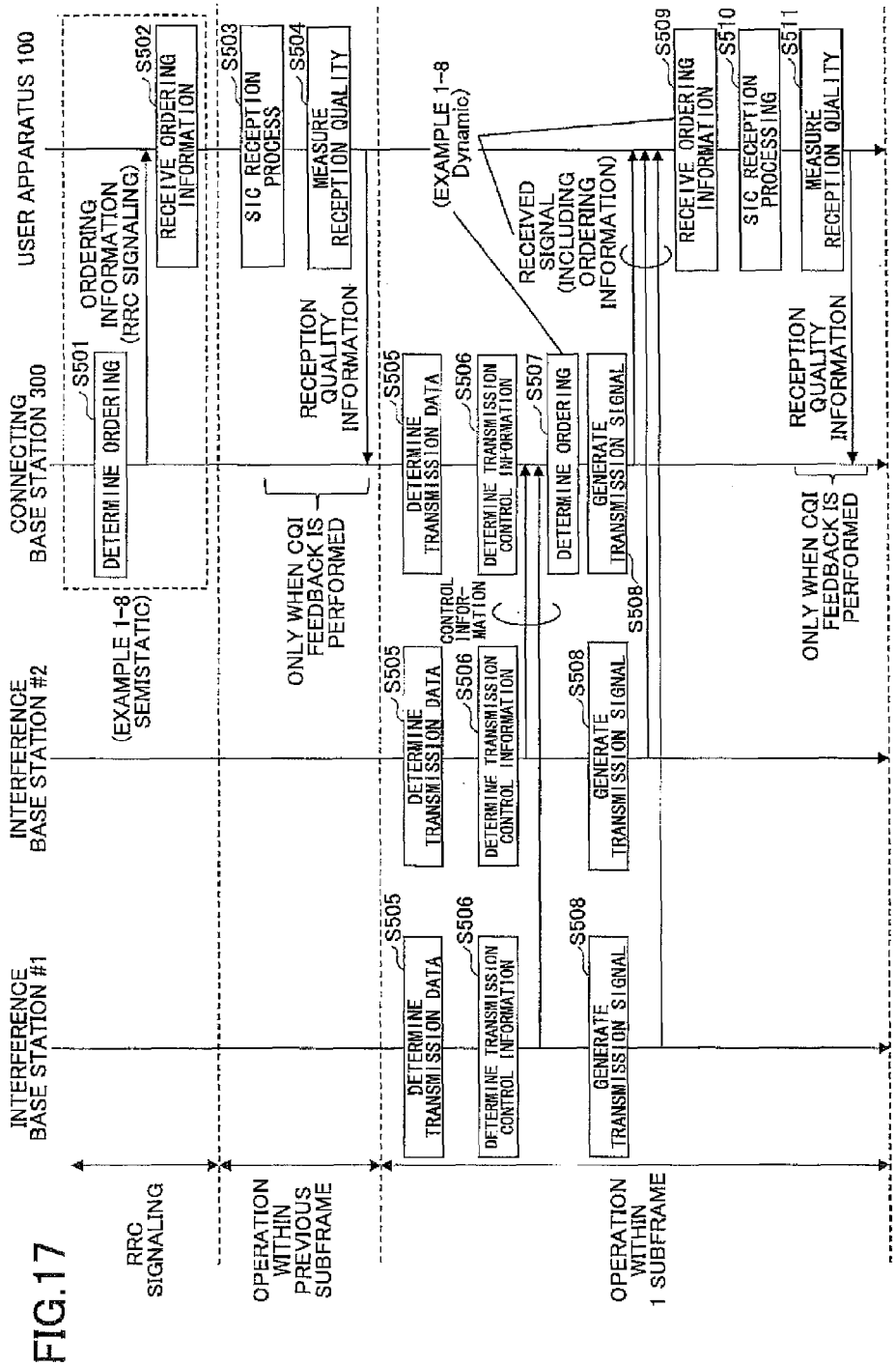
FIG. 17 is a diagram showing a process sequence example in a case where ordering is specified from the connecting base station 200 to the user apparatus 100.

FIG. 17 shows a process sequence example in a case where ordering is specified to the user apparatus 100 from the connecting base station 200.

The ordering determination unit 706 of the connecting base station 200 determines ordering (step 501). In a case of semistatic notification, the user apparatus 100 receives ordering information here (step 502).

Also, in an example where CQI feed-back is performed, the SIC reception process unit 804 of the user apparatus performs reception processing (step 503), the reception quality measurement unit 803 measures reception quality for each interference signal (step 504), and transmits reception quality information to the connecting base station 200.

Each base station determines transmission data (step 505), determines transmission control information (step 506). The ordering determination unit 706 of the connecting base station 200 determines ordering information in dynamic notification (step 507). A transmission signal is generated and transmitted (step 508). The user apparatus 100 receives signals transmitted from each base station.

In the user apparatus 100, the ordering information reception unit 802 receives ordering information (step 509), the SIC reception process unit 804 performs SIC reception processing based on the ordering (step 510), the reception quality measurement unit 803 performs reception quality measurement (step 511), and transmits reception quality information to the connecting base station 200.

The configuration of each apparatus described in the above is an example. Configurations of the user apparatus and the base station are not limited to those described so far, and any configuration can be adopted as long as the apparatus configuration can realize operation described in the embodiments.

For example, according to an embodiment of the present invention, there is provided a user apparatus for use in a radio communication system, including: an successive interference cancelling reception unit configured to obtain a desired signal by successively canceling an interference signal that becomes interference to the desired signal from a received signal that the user apparatus receives; and an ordering determination unit configured to determine an order of interference signals to be successively canceled by the successive interference cancelling reception unit, wherein the ordering determination unit determines the order based on reception quality for each interference signal.

The ordering determination unit can determine the order based on, as the reception quality, RSRP, output SINR, bit error rate or block error rate. The order is, for example, an descending order of reception quality. Accordingly, an interference signal that can be accurately demodulated can be canceled first, so that an interference replica of the later stage can be generated accurately. As a result, characteristics of SIC can be improved.

For example, the ordering determination unit divides interference signals into ordered groups based on a moderation scheme or a rank of an interference signal transmitted from an interference base station for the user apparatus, determines an order of interference signals for each group, and determines the order of interference signals to be successively cancelled according to the order determined for each group. In the grouping, for example, rank 1 or QPSK that can be accurately demodulated is determined to be an upper level group.

By adopting the above-mentioned configuration, an interference signal that can be accurately demodulated can be canceled first, so that an interference replica of the later stage can be generated accurately. As a result, characteristics of SIC can be improved.

Also, the user apparatus may include an auxiliary information reception unit configured to receive auxiliary information on a modulation scheme or a rank of an interference signal from a connecting base station of the user apparatus, wherein the ordering determination unit corrects the reception quality by using the reception quality measured in the user apparatus and the auxiliary information, and determines the order of interference signals to be successively canceled based on corrected reception quality. By using the auxiliary information, for example, reception quality (corrected reception quality) of an interference signal that can be accurately demodulated can be increased.

In addition, the user apparatus may include a signal restriction unit configured to restrict, based on a predetermined criterion, the number of interference signals of targets of successive canceling in the successive interference canceling reception unit. Accordingly, process load can be decreased in the user apparatus.

Also, a connecting base station that communicates with the user apparatus determines an interference signal to be successively canceled in the user apparatus based on control information, of an interference signal, received from an interference base station, the user apparatus includes a restriction information reception unit configured to receive information indicating the interference signal to be successively canceled from the connecting base station, and the signal restriction unit may be configured to determine an interdependence signal to be successively canceled based on the information indicating the interference signal.

By restricting signals based on information received from the connecting base station, signal restriction can be performed more properly.

Also, according to an embodiment of the present invention, there is provided a base station, for use in a radio communication system, configured to communicate with a user apparatus, wherein the user apparatus includes an successive interference cancelling reception unit configured to obtain a desired signal by successively canceling an interference signal that becomes interference to the desired signal from a received signal that the user apparatus receives, the base station including: an interference control information reception unit configured to receive control information of an interference signal from an interference base station for the user apparatus; an ordering determination unit configured to determine an order of interference signals to be successively canceled by the successive interference cancelling reception unit of the user apparatus based on the control information of the interference signal; and a transmission unit configured to transmit, to the user apparatus, information of the order of interference signals determined by the ordering determination unit.

The base station receives reception quality information for each interference signal from the user apparatus, and the ordering determination unit may be configured to determine the order of interference signals to be successively canceled by the successive interference canceling reception unit of the user apparatus based on control information of the interference signal and the reception quality. By using reception quality information for each interference signal, the order of interference signals can be determined more properly.

In the above, the present invention has been explained while referring to the specific embodiments. However, these are merely exemplary. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus (UE) and the base station (eNodeB) have been explained by using functional block diagrams. However, the apparatuses may be implemented in hardware, software, or a combination thereof. The software that operates according to the present invention (software executed by a processor provided in the user apparatus, software executed by a processor provided in the base station eNB) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-165478, filed in the JPO on Aug. 8, 2013 and Japanese patent application No. 2014-059256, filed in the JPO on Mar. 20, 2014, and the entire contents of the Japanese patent application No. 2013-165478 and the Japanese patent application No. 2014-059256 are incorporated herein by reference.

DESCRIPTION OF REFERENCE SIGNS 100 user apparatus
200 connecting base station
300 interference base station
101, 201, 401, 601, 801 radio I/F
102, 402, 606 RSRP measurement unit
103, 203 interference signal information storage unit
104, 204 signal group determination unit
105 RSRP measurement signal restriction unit
106, 405 SIC process signal restriction unit
107, 208, 406, 607 ordering determination unit
108, 209, 407, 608, 804 SIC reception process unit
202 output SINR measurement unit
205 output SINR measurement signal restriction unit
206 BER calculation unit
207 BER information storage unit
208 SIC process signal restriction unit
403 auxiliary information reception unit
404 RSRP offset calculation unit
602 connecting cell channel estimation unit
603 desired PDCCH demodulation unit
604 interference control information storage unit
605 SIC control information reception unit
802 ordering information reception unit
803 reception quality measurement unit
301, 501, 701 transmission data storage unit
302, 502, 702 transmission control information determination unit
303, 503, 703 control information transmission unit
304, 504, 704 interference control information reception unit
305 auxiliary information calculation unit
306, 506, 707 transmission signal generation unit
307, 507, 708 wire I/F
308, 508, 709 radio I/F
505 SIC restriction determination unit
705 reception quality information receiving unit
706 ordering determination unit

The invention claimed is:

1. A user apparatus for use in a radio communication system, comprising:
   a successive interference canceling reception unit configured to obtain a desired signal by successively canceling an interference signal that becomes interference to the desired signal from a received signal that the user apparatus receives;
   an ordering determination unit configured to determine an order of interference signals to be successively canceled by the successive interference canceling reception unit; and
   a signal restriction unit configured to restrict, based on a predetermined criterion, the number of interference signals of targets of successive canceling in the successive interference canceling reception unit,
   wherein the ordering determination unit determines the order based on reception quality for each interference signal.

2. The user apparatus as claimed in claim 1, wherein the ordering determination unit determines the order based on, as the reception quality, RSRP, output SINR, bit error rate or block error rate.

3. The user apparatus as claimed in claim 1, wherein the ordering determination unit divides interference signals into ordered groups based on a moderation scheme or a rank of an interference signal transmitted from an interference base station for the user apparatus, determines an order of interference signals for each group, and determines the order of interference signals to be successively canceled according to the order determined for each group.

4. The user apparatus as claimed in claim 1, comprising an auxiliary information reception unit configured to receive auxiliary information on a modulation scheme or a rank of an interference signal from a connecting base station of the user apparatus,
   wherein the ordering determination unit corrects the reception quality by using the reception quality measured in the user apparatus and the auxiliary information, and determines the order of interference signals to be successively canceled based on corrected reception quality.

5. The user apparatus as claimed in claim 1, wherein a connecting base station that communicates with the user apparatus determines an interference signal to be successively canceled in the user apparatus based on control information, of an interference signal, received from an interference base station,
the user apparatus comprises a restriction information reception unit configured to receive information indicating the interference signal to be successively canceled from the connecting base station, and
wherein the signal restriction unit determines an interdependence signal to be successively canceled based on the information indicating the interference signal.

6. A base station, for use in a radio communication system, configured to communicate with a user apparatus,
wherein the user apparatus comprises a successive interference canceling reception unit configured to obtain a desired signal by successively canceling an interference signal that becomes interference to the desired signal from a received signal that the user apparatus receives, the base station comprising:
an interference control information reception unit configured to receive control information of an interference signal from an interference base station for the user apparatus;
an ordering determination unit configured to determine an order of interference signals to be successively canceled by the successive interference canceling reception unit of the user apparatus based on the control information of the interference signal; and
a transmission unit configured to transmit, to the user apparatus, information of the order of interference signals determined by the ordering determination unit.

7. The base station as claimed in claim 6, wherein, the base station receives reception quality information for each interference signal from the user apparatus, and
the ordering determination unit determines the order of interference signals to be successively canceled by the successive interference canceling reception unit of the user apparatus based on control information of the interference signal and the reception quality.

8. A successive interference canceling process method executed by a user apparatus for use in a radio communication system, comprising:
an ordering determination step of determining an order of interference signals to be successively canceled in a successive interference canceling process for obtaining a desired signal by successively canceling an interference signal that becomes interference to the desired signal from a received signal that the user apparatus receives;
a signal restriction step of restricting, based on a predetermined criterion, the number of interference signals of targets of successive canceling in the successive interference canceling process; and
a successive interference canceling process step of performing the successive interference canceling process according to the order of interference signals determined in the ordering determination step,
wherein, in the ordering determination step, the user apparatus determines the order based on reception quality for each interference signal.

9. A successive interference canceling control method executed by a base station, for use in a radio communication system, configured to communicate with a user apparatus,
wherein the user apparatus comprises a successive interference canceling reception unit configured to obtain a desired signal by successively canceling an interference signal that becomes interference to the desired signal from a received signal that the user apparatus receives, the successive interference canceling control method executed by the base station comprising:
an interference control information reception step of receiving control information of an interference signal from an interference base station for the user apparatus;
an ordering determination step of determining an order of interference signals to be successively canceled by the successive interference canceling reception unit of the user apparatus based on the control information of the interference signal; and
a transmission step of transmitting, to the user apparatus, information of the order of interference signals determined by the ordering determination step.

10. The user apparatus as claimed in claim 2, wherein the ordering determination unit divides interference signals into ordered groups based on a moderation scheme or a rank of an interference signal transmitted from an interference base station for the user apparatus, determines an order of interference signals for each group, and determines the order of interference signals to be successively canceled according to the order determined for each group.

11. The user apparatus as claimed in claim 2, comprising an auxiliary information reception unit configured to receive auxiliary information on a modulation scheme or a rank of an interference signal from a connecting base station of the user apparatus,
wherein the ordering determination unit corrects the reception quality by using the reception quality measured in the user apparatus and the auxiliary information, and determines the order of interference signals to be successively canceled based on corrected reception quality.

12. The user apparatus as claimed in claim 3, comprising an auxiliary information reception unit configured to receive auxiliary information on a modulation scheme or a rank of an interference signal from a connecting base station of the user apparatus,
wherein the ordering determination unit corrects the reception quality by using the reception quality measured in the user apparatus and the auxiliary information, and determines the order of interference signals to be successively canceled based on corrected reception quality.

13. The user apparatus as claimed in claim 2, comprising a signal restriction unit configured to restrict, based on a predetermined criterion, the number of interference signals of targets of successive canceling in the successive interference canceling reception unit.

14. The user apparatus as claimed in claim 3, comprising a signal restriction unit configured to restrict, based on a predetermined criterion, the number of interference signals of targets of successive canceling in the successive interference canceling reception unit.

15. The user apparatus as claimed in claim 4, comprising a signal restriction unit configured to restrict, based on a predetermined criterion, the number of interference signals of targets of successive canceling in the successive interference canceling reception unit.

\* \* \* \* \*